US012760974B2

(12) United States Patent
Stack et al.

(10) Patent No.: US 12,760,974 B2
(45) Date of Patent: Oct. 13, 2026

(54) ELECTRICALLY CONDUCTIVE BRICKWORK MODULE FOR USE AS A HEATING AND/OR THERMAL STORAGE SYSTEM

(71) Applicant: Electrified Thermal Solutions, Inc., Medford, MA (US)

(72) Inventors: Daniel Stack, Cambridge, MA (US); Joey Kabel, Arlington, MA (US); Bao Truong, Canton, MA (US); Kwadwo Sarpong, Everett, MA (US)

(73) Assignee: Electrified Thermal Solutions, Inc., Medford, MA (US)

( * ) Notice: Subject to any disclaimer, the term of this patent is extended or adjusted under 35 U.S.C. 154(b) by 182 days.

(21) Appl. No.: 18/790,819

(22) Filed: Jul. 31, 2024

(65) Prior Publication Data

US 2025/0052516 A1 Feb. 13, 2025

Related U.S. Application Data

(60) Provisional application No. 63/516,999, filed on Aug. 1, 2023, provisional application No. 63/516,997, filed on Aug. 1, 2023.

(51) Int. Cl.
*F28D 20/00* (2006.01)
*H05B 3/12* (2006.01)
(Continued)

(52) U.S. Cl.
CPC ........... *F28D 20/0056* (2013.01); *H05B 3/12* (2013.01); *F02C 6/14* (2013.01); *F05D 2260/42* (2013.01); *H05B 3/16* (2013.01); *H05B 3/18* (2013.01)

(58) Field of Classification Search
CPC ......... F28D 20/0056; H05B 3/12; H05B 3/16; H05B 3/18; F02C 6/14; F05D 2260/42
(Continued)

(56) References Cited

U.S. PATENT DOCUMENTS

| | | | | |
|---|---|---|---|---|
| 12,366,180 | B2 * | 7/2025 | O'Donnell | F01K 3/02 |
| 2022/0132633 | A1 * | 4/2022 | Forsberg | H05B 3/14 |
| 2023/0203968 | A1 | 6/2023 | O'Donnell et al. | |

FOREIGN PATENT DOCUMENTS

| | | | |
|---|---|---|---|
| AT | 514922 | A4 | 5/2015 |
| EP | 0439704 | A1 | 8/1991 |

(Continued)

OTHER PUBLICATIONS

International Searching Authority—International Search Report, pertaining to International Application No. PCT/CUS2024/040393 dated Dec. 4, 2024, together with the Written Opinion of the International Searching Authority, 14 pages.

(Continued)

*Primary Examiner* — Joel M Attey
(74) *Attorney, Agent, or Firm* — Saul Ewing LLP

(57) ABSTRACT

An electrically conductive brickwork module configured to be used in an electrically heated thermal energy storage system and/or a resistive heating system to heat a fluid flowing across a dimension of the electrically conductive brickwork module from an input to an output. The module includes a plurality of electrically interconnected sets of electrically conductive bricks configured to be heated when electricity flows there through and a plurality of electrically insulating bricks separating each pair of adjacent sets of the plurality of electrically interconnected sets. There are and a plurality of flow paths defined by the plurality of electrically (Continued)

insulating and physically separated from the electrically conductive bricks to direct a fluid flowing from the input to the output.

16 Claims, 23 Drawing Sheets

(51) Int. Cl.
*F02C 6/14* (2006.01)
*H05B 3/16* (2006.01)
*H05B 3/18* (2006.01)

(58) Field of Classification Search
USPC ........................................................ 165/10
See application file for complete search history.

(56) References Cited

FOREIGN PATENT DOCUMENTS

| | | | |
|---|---|---|---|
| EP | 2017561 | A2 | 1/2009 |
| WO | 2014026559 | A1 | 2/2014 |
| WO | 2022160004 | A1 | 8/2022 |

OTHER PUBLICATIONS

Stack, "Conceptual Design and Performance Characteristics of Firebrick Resistance-heated Energy Storage for Industrial Heat Supply and Variable Electricity Production", Thesis, Feb. 2017, 166 pages.

* cited by examiner

ELECTRICALLY CONDUCTIVE BRICKWORK MODULE FOR USE AS A HEATING AND/OR THERMAL STORAGE SYSTEM

CROSS REFERENCE TO RELATED APPLICATIONS

This application claims priority from U.S. Provisional Application No. 63/516,999 and from U.S. Provisional Application No. 63/516,997, both of which were filed on Aug. 1, 2023, the disclosures of which are incorporated by reference herein in their entireties. This application incorporates by reference, in their entireties, each of the following related and commonly owned provisional applications filed on even date herewith and having the following titles: Gas Turbine with an Electrically Heated Thermal Energy Storage System, U.S. application Ser. No. 18/790,901; Chromium Electrodes to Deliver Electric Power to Oxide Brick Circuits, U.S. application Ser. No. 18/791,024; Ceramic-Metal Composites for Use as Heating Elements for Electrified Resistance Heating and Thermal Energy Storage Systems, U.S. application Ser. No. 18/790,995; Electrically Conductive Brickwork Assembly for Use as a Heating and/or Thermal Storage System, U.S. application Ser. No. 18/790,819; Modulating Electrical Resistance along a Column of E-Bricks, U.S. Provisional Application No. 63/677,824; and Bent Pipe-Shaped Electrically Conductive Cross Brick Design, U.S. Provisional Application No. 63/677,894.

TECHNICAL FIELD

The present disclosure relates to an electrically conductive brickwork module and more particularly to an electrically conductive brickwork module for use as a heating and/or thermal storage system.

BACKGROUND ART

Traditional firebricks are a type of brick designed to insulate heat and withstand high temperatures, with common applications including lining furnaces, kilns, and chimneys. Electrically conductive firebrick systems combine this traditional heat-withstanding quality with electrical conductivity to enable thermal heating and storage solutions capable of reaching temperatures in the 1000° C. to 2000° C. or higher, and reliably cycling between a predetermined temperature range (e.g. ~1000° C. to ~1800° C.) on a daily basis without requiring the burning of fossil fuels. In such systems air/gas may be flowed through the firebrick system to extract the heat for various uses, including for use in industrial processes.

One such firebrick system is described in U.S. Pat. No. 11,877,376. In the disclosed firebrick system, air/gas flows straight over the conductive bricks. In the case of chromium oxide bricks, which may be used in this system, it has been found that the chromium oxide volatilizes, which erodes the brick's electrical performance over time, and also produces a toxic gas ($CrO_3$) that must be kept below regulated levels and as low as possible.

SUMMARY OF THE EMBODIMENTS

In accordance with one embodiment of the invention, there is an electrically conductive brickwork module configured to be used in an electrically heated thermal energy storage system or a resistive heating system to heat fluid flowing across a dimension of the electrically conductive brickwork module from an input to an output. There are a plurality of electrically insulating columns, each formed of a plurality of electrically insulating bricks, wherein each electrically insulating brick includes a hollow central region. There are a plurality of electrically interconnected conductive bricks disposed in each insulating column through the hollow central regions of the electrically insulating bricks and the plurality of electrically interconnected conductive bricks configured to be heated when electricity flows there through. There is at least one flow path from the input to the output of the electrically conductive brickwork module formed by a gap between at least two of the plurality of electrically insulating columns configured to direct a fluid flowing from the input to the output without the fluid physically contacting the plurality of electrically conductive bricks.

In other embodiments there may be one or more of the following features. There may be a plurality of flow paths from the input to the output of the electrically conductive brickwork module formed by a gap between each adjacent electrically insulating column of the plurality of electrically insulating columns. Between each adjacent electrically insulating column there may be an interconnecting electrically conductive brick to electrically connect the electrically interconnected conductive bricks disposed in each of the electrically insulating columns. In a direction across the plurality of flow paths there may be disposed a plurality of interlocking insulating bricks at one or more height positions of the plurality of electrically insulating columns to provide structural support for the electrically conductive brickwork module. In a direction along the plurality of flow paths there may be disposed a plurality of interlocking insulating bricks at one or more height positions of the plurality of electrically insulating columns to provide structural support for the electrically conductive brickwork module. The electrically insulating bricks may be staggered in both lengthwise and widthwise directions, such that an electrically insulating brick is laid across the joint of two or more electrically insulating bricks below it. The interlocking insulating bricks may be interlocked with adjacent insulating bricks of by tongue and groove patterns on the tops and bottoms of each brick, respectively. The interlocking insulating bricks may have a height less than a height of the non-interconnecting electrically insulating bricks.

In accordance with another embodiment of the invention, there is an electrically conductive brickwork module configured to be used in an electrically heated thermal energy storage system and/or a resistive heating system to heat a fluid flowing across a dimension of the electrically conductive brickwork module from an input to an output. There are a plurality of electrically interconnected sets of electrically conductive bricks configured to be heated when electricity flows there through. There are a plurality of electrically insulating barriers formed of electrically insulating bricks, an electrically insulating barrier disposed between each pair of adjacent sets of electrically conductive bricks. There are a plurality of flow paths physically separated from the electrically conductive bricks and configured to direct a fluid flowing from the input to the output.

In yet further other embodiments there may be one or more of the following features. The plurality of flow paths may be disposed in an interior region of one or more of the plurality of electrically insulating barriers. The plurality of flow paths may have an arched cross-sectional shape. The plurality of electrically interconnected sets of electrically conductive bricks may be arranged in an array having a width dimension and a length dimension and the plurality of electrically insulating barriers formed of electrically insulating bricks are interconnected and form a first plurality of barrier walls running along the length dimension and across the width dimension of the array and a second plurality of barrier walls running along the width dimension and across the length dimension of the array. The first plurality of barrier walls may intersect with the second plurality of barrier walls. The plurality of flow paths may be disposed in one of the first plurality of barrier walls or the second plurality of barrier walls. The plurality of sets of electrically conductive bricks may be arranged in one of a plurality of columns or a plurality of rows and each set of electrically conductive bricks is physically and electrically connected to an adjacent set of electrically conductive bricks by an interconnecting electrically conductive brick.

In accordance with yet another embodiment of the invention, there is an electrically conductive brickwork module configured to be used in an electrically heated thermal energy storage system and/or a resistive heating system to heat a fluid flowing across a dimension of the electrically conductive brickwork module from an input to an output. There are a plurality of electrically interconnected sets of electrically conductive bricks configured to be heated when electricity flows there through. There are a plurality of electrically insulating bricks separating each pair of adjacent sets of the plurality of electrically interconnected sets. There are a plurality of flow paths defined by the plurality of electrically insulating bricks and physically separated from the electrically conductive bricks to direct the fluid flowing from the input to the output.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

The disclosure and the various features and advantageous details thereof are explained more fully with reference to the non-limiting embodiments and examples that are described and/or illustrated in the accompanying drawings and detailed in the following description. Various aspects of the subject matter discussed in greater detail below may be implemented in any of numerous ways, as the subject matter is not limited to any particular manner of implementation. Examples of specific implementations and applications are provided primarily for illustrative purposes.

Unless otherwise defined, used, or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms "includes," "including," "comprises," and "comprising" specify the presence of the stated elements or steps but does not preclude the presence or additional of one or more other elements or steps.

Embodiments of brickwork modules described herein may comprise, or make use of, electrically-conductive (and thermally conductive) bricks ("E-bricks"). E-bricks generate heat when a current is run through them via direct resistance heating (DRH). E-bricks may be capable of reaching very high temperatures, such as 1000° C. to 2000° C. or higher, and reliably cycling between a predetermined temperature range (e.g. ~1000° C. to ~1800° C.) on a daily basis. E-bricks may be stacked and arranged into a large structure, a thermal energy storage system ("TESS") (a.k.a. an electrically heated thermal energy storage system E-TESS), which may also be referred to herein as brickwork modules. Examples of E-bricks and E-TESS's may be found in U.S. Pat. No. 11,877,376, the contents of which are hereby incorporated, in full, by reference. Embodiments of brickwork modules or E-TESS's may be used, for example, in various industrial and chemical processes that generate and/or consume heat, such as furnaces, kilns, refineries, power plants, allowing these processes to significantly reduce or eliminate burning of fossil fuels.

Figure 1:
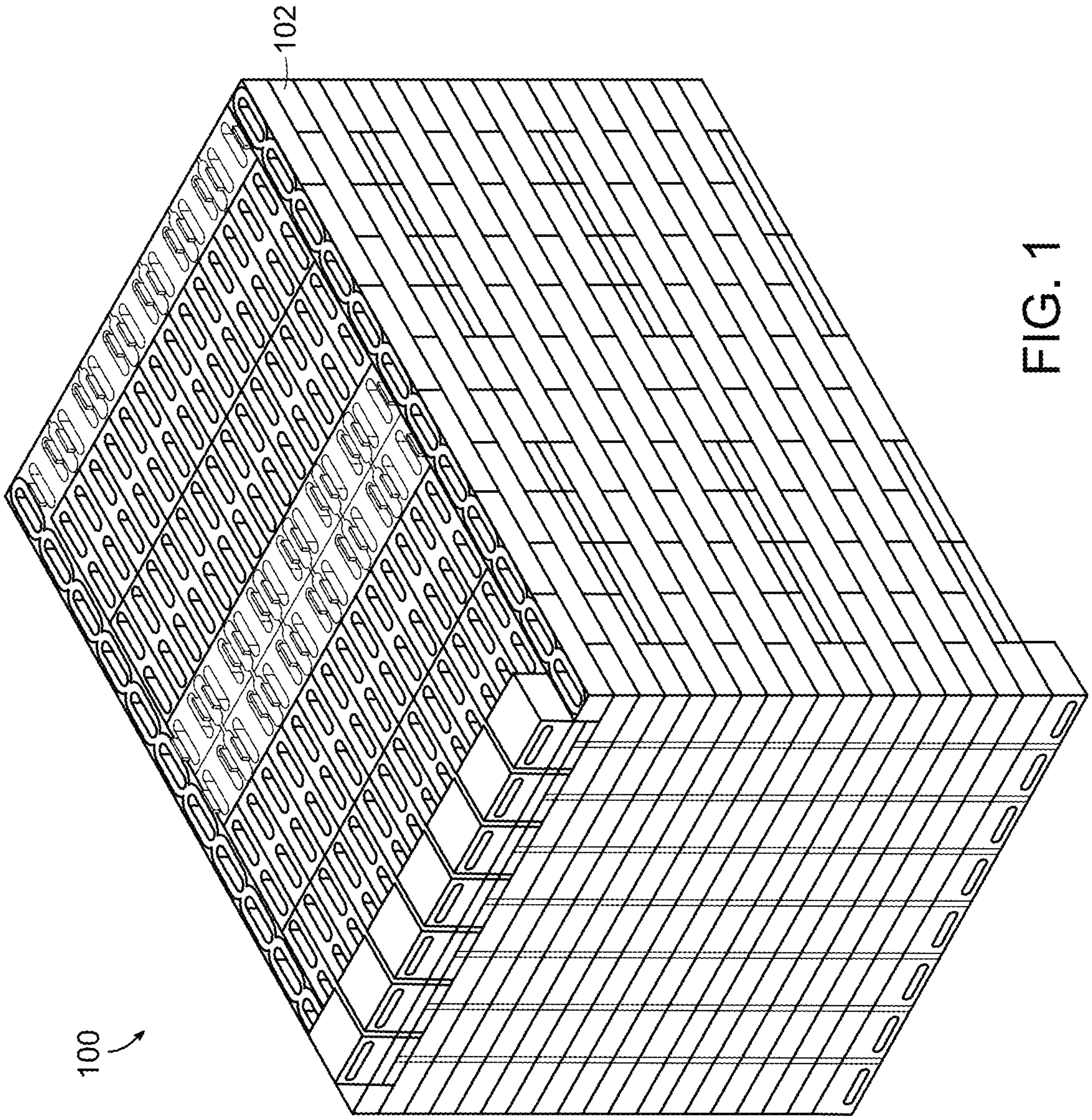
FIG. 1 provides a perspective view of an exemplary E-TESS system according to an aspect of this disclosure.
Figure 2:
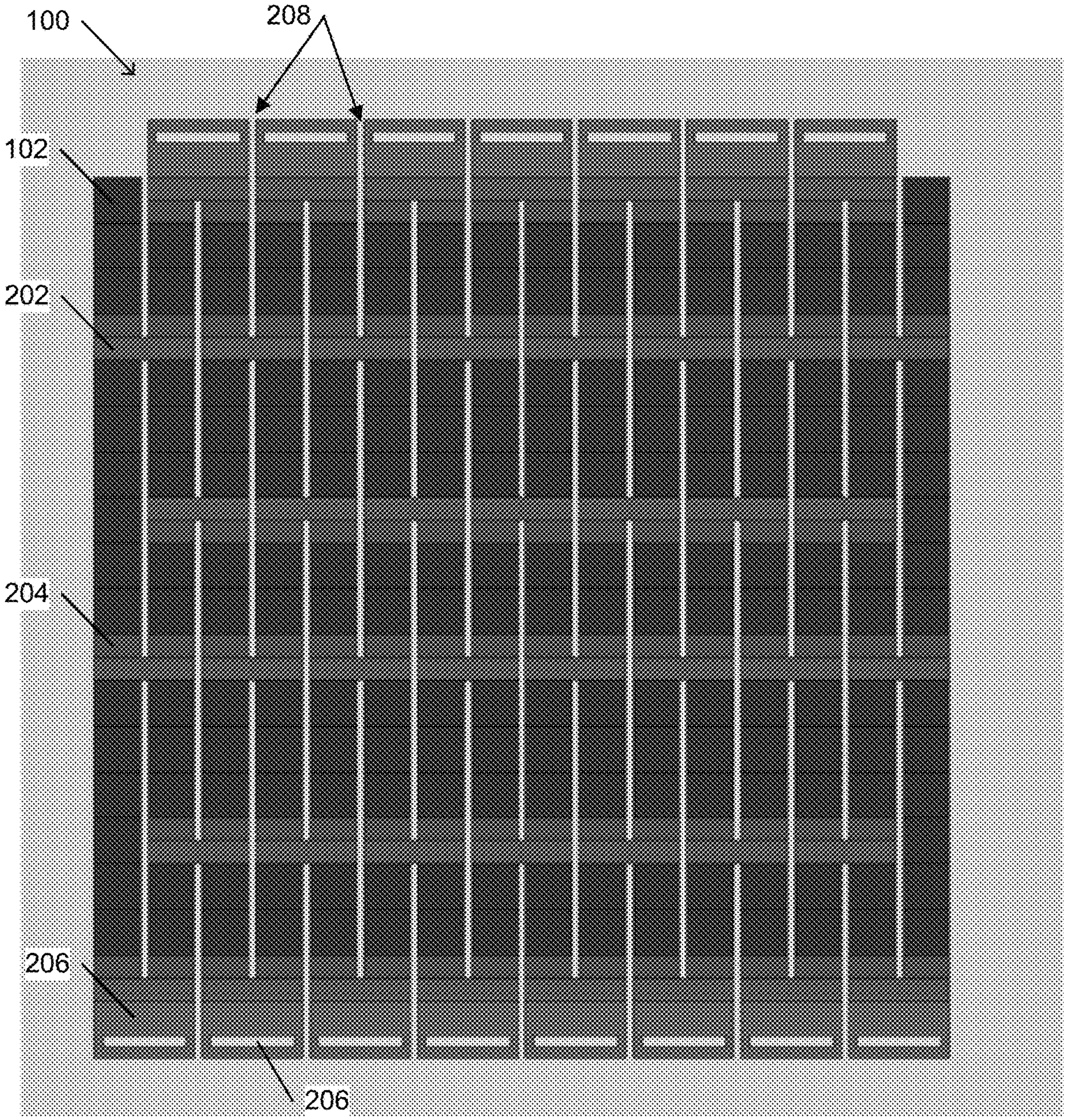
FIG. 2 provides a cross-sectional view of the exemplary E-TESS system of FIG. 1.

FIG. 1 shows an exemplary embodiment of a brickwork module or an E-TESS module 100, which is primarily composed of a large quantity of electrically and thermally conductive brick assemblies 102 ("E-brick assemblies"). The E-brick assembly 102 may comprise an electrically-conductive brick 300 ("E-brick"), FIG. 3, contained within an electrically insulating (but thermally conductive) brick 400 ("I-brick"), FIG. 4. In some embodiments there may be more than one E-brick contained within an I-brick, or there may be a plurality of I-bricks that, in combination, provide insulation to one or more E-bricks. In FIGS. 1 and 2, only the I-bricks of the E-brick assemblies 102 are visible, as the E-bricks are contained in an internal region within the I-brick as shown in FIG. 4 and described below. The E-bricks in each column are physically in contact with each other and physically connected to the E-bricks in adjacent columns with an interconnecting E-Brick to form one contiguous electrical circuit when a voltage is applied across the E-TESS module 100, thereby causing an electric current to flow through the electrical circuit formed by the E-bricks.

The E-TESS module 100 generates a large amount of thermal energy when an electrical current is run through the contiguous circuit of E-bricks. The thermal energy may be stored in the E-bricks/I-bricks for extended periods of time (e.g., up to 24 hours). The thermal energy may be harvested immediately, or after it has been stored, by flowing, e.g., a fluid through E-TESS module 100. The fluid may be a liquid and/or a gas, such as air or $CO_2$. The thermal energy in the E-bricks is transferred to the I-bricks and flow paths or channels (shown in FIG. 2) between the columns of E-brick assemblies 102 allow the fluid to flow through the E-TESS module 100. This application may henceforth refer to fluid, gas, or air flowing through the flow paths or channels of E-TESS module 100, but it should be noted that these terms may be used interchangeably herein. Moreover any suitable fluid/gas, such as air or $CO_2$, may be used to extract the heat out of E-TESS module 100. Additionally, some bricks are left out of the view in FIG. 1 to provide easier viewing.

FIG. 2 shows a side view of an embodiment of E-TESS module 100. The E-TESS module 100 comprises a large quantity of E-brick assemblies 102, arranged in a plurality of adjacent columns, which are physically and electrically interconnected in a serpentine fashion to form a contiguous circuit. The E-brick assemblies 102 may, in large part, be conductive only in the vertical direction (i.e., along the length of the columns), and electrically externally insulated in all other directions by the I-bricks, such that current follows the serpentine circuit (via the connected E-bricks) and does not arc between columns of E-brick assemblies 102, when there is a potential difference between the columns, e.g. in a case where different phases power are being run through adjacent columns.

Between columns there are flow paths or channels 208, through which air/gas may flow (in the direction into or out of the page) in order to extract or harvest the thermal energy generated by the E-bricks (and transferred to the I-Bricks) to be used to heat a load. By flowing the air/gas through the flow paths 208 the heat may be extracted from the E-TESS module 100 without having the air contact the E-bricks directly. This is especially useful because if the E-bricks comprise $Cr_2O_3$ and are exposed to the flowing air directly, then the $Cr_2O_3$ tends to volatilize, which erodes the brick electrical performance over time, and also produces a toxic gas, $CrO_3$, which must be kept below regulated levels and as low as possible.

Electric current may enter the E-TESS module 100, for example, through a wire or cable (not shown) connected to the top left corner (from the perspective of FIG. 2), and may exit the E-TESS 100 through a cable (not shown) connected to the top right corner. In addition to the E-brick assemblies 102, there may be other bricks, such as double-wide bricks 202, thin bricks 204, and end connector bricks 206 used in the E-TESS module 100.

Figure 7:
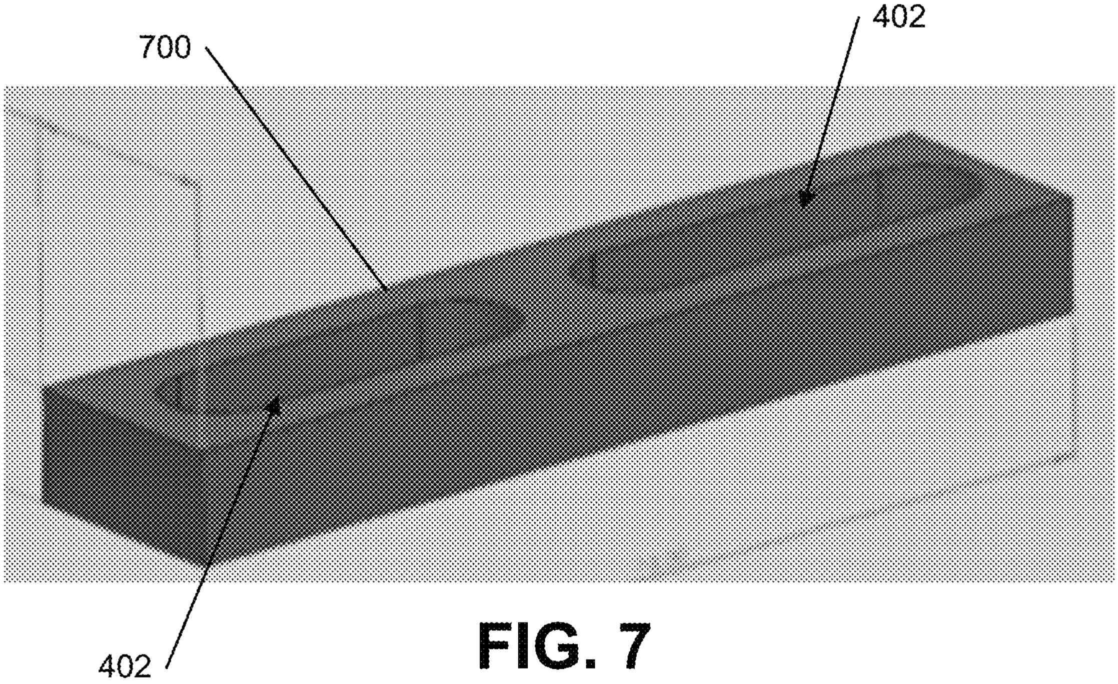
FIG. 7 shows a perspective view of an embodiment of a double wide, thin I-Brick according to this disclosure.

Double-wide bricks 202 provide horizontal stabilization between columns of E-brick assemblies 102, and structural integrity of the E-TESS module 100. Double-wide bricks 202 are insulated such that current can flow vertically within columns, but does not flow across them between columns. Double-wide bricks 202 may be thinner (i.e., have a lower height) than E-brick assemblies 102, because double-wide bricks 202 span the gaps 208 between columns, and therefore partially obstruct the airflow through the gaps 208. Double-wide bricks 202 may, for example, be half the height of an E-brick assembly 102. A more detailed view of such a double wide thinner I-Brick is depicted in FIG. 7.

Figure 8:
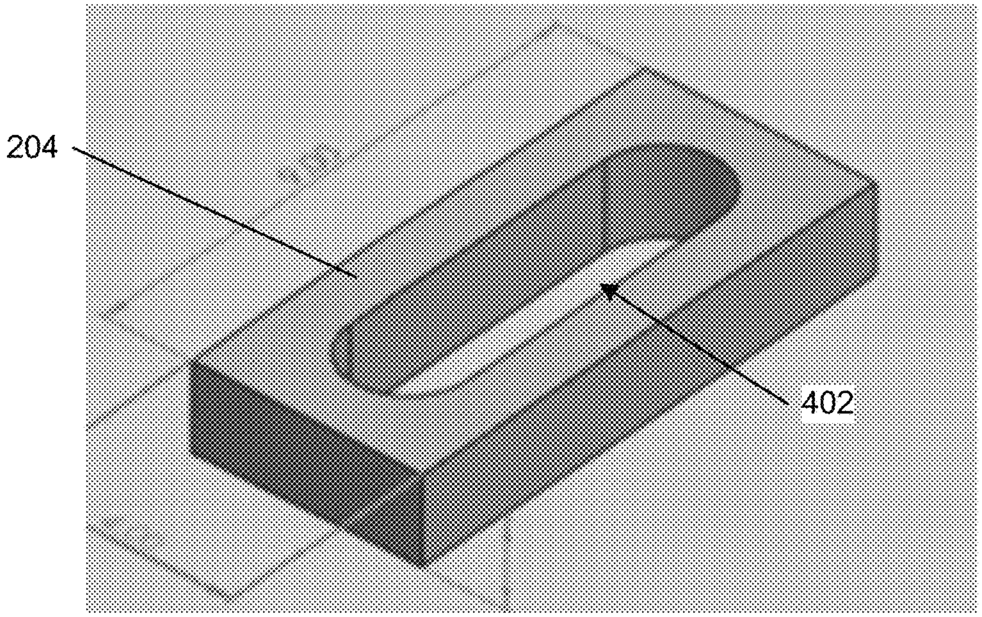
FIG. 8 shows a perspective vie wan embodiment of a single wide, thin I-Brick.
Figure 9:
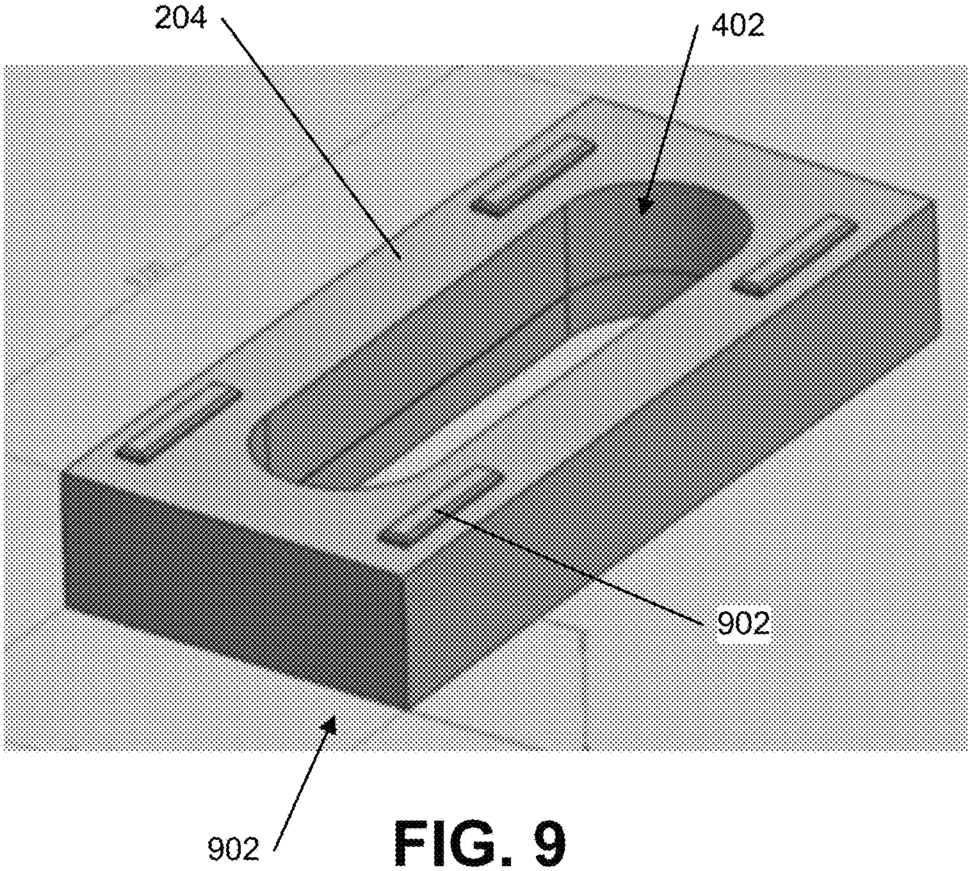
FIG. 9 shows another embodiment of a thin I-Brick comprising one multiple tongues for interlocking.

Thin bricks 204 are single-wide, like an E-brick assembly 102, but thinner, i.e., have a lower height than an E-brick assembly 102. Thin bricks 204 may, for example, be half the height of an E-brick assembly 102. Thin bricks 204 may be used in conjunction with double-wide bricks 202 such that the height of the double-wide brick 202 and thin brick 204 stack is equal to the height of an E-brick assembly 102. Thin bricks 204 may also be used in place of a double-wide brick 202 to maintain even levels of bricks in situations where a double-wide brick 202 is not desirable in at least one column, e.g., due to its obstructing effect on airflow, but is desirable in another column of that level. More detailed views of two versions of single-wide thinner I-Bricks are depicted in FIGS. 8 and 9.

End connector bricks 206 connect columns of bricks together, both physically and electrically. End connector bricks 206 act as end caps to columns of bricks and contain within them interconnecting E-bricks which may be of a different shape than those contained in the E-brick assemblies 102 to physically and electrically connect the E-Bricks from one column of E-brick assemblies 102 to an adjacent column of E-brick assemblies 102. Current may, for example, flow down one column of bricks, perform a "U-turn" through an end connector brick 206, and then flow up the adjacent column, until it reaches the next end connector brick 206, wherein it will perform another "U-turn", and continue in that fashion. End connector bricks may have channels or cutouts though which air may flow. End connector bricks 206 may typically have a flat bottom (or top, depending on its orientation).

Figure 3:
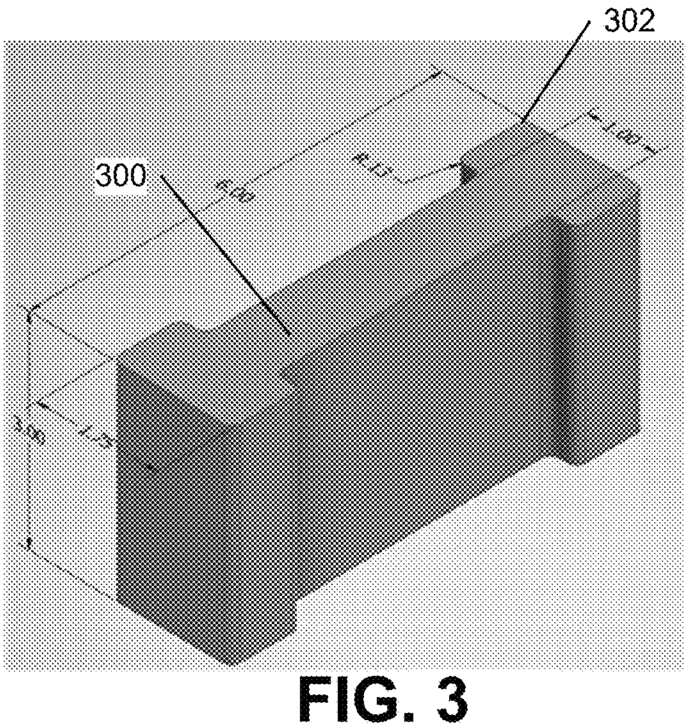
FIG. 3 provides a perspective view of an exemplary electrically conductive brick of the E-TESS system according to an aspect of this disclosure.
Figure 4:
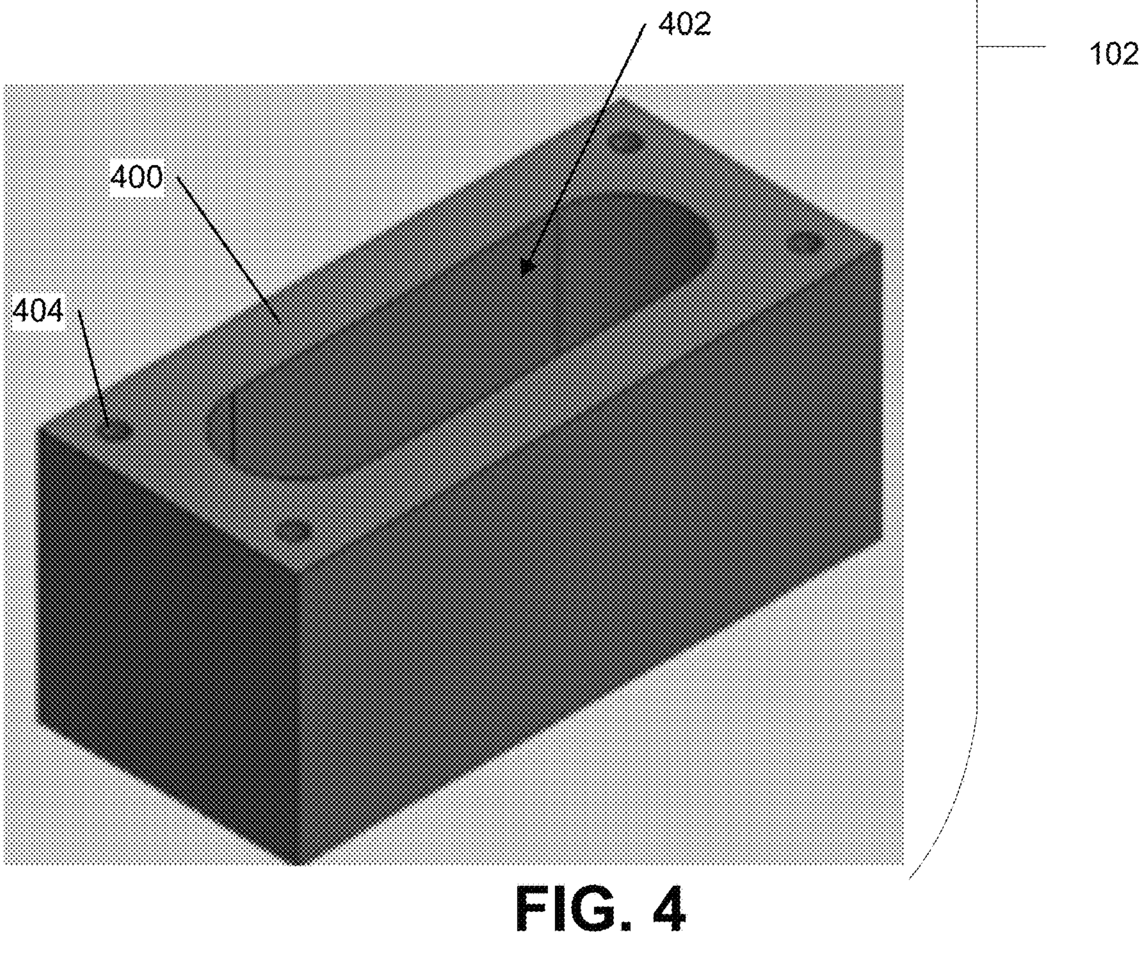
FIG. 4 provides a perspective view of an exemplary electrically insulative brick of the E-TESS system according to an aspect of this disclosure.

FIG. 3 shows a specific embodiment of an electrically-conductive brick 300 ("E-brick"). As described above, E-bricks 300 may be configured to stack vertically with each other, which creates a part of a conductive circuit through which current and heat may flow. E-bricks 300 may be formed in many different shapes, including cross-sectional shapes of circles, rectangles, squares, or crosses, for example. FIG. 3 shows an example of a "dog bone" shaped E-brick. The E-brick 300 may have rounded or chamfered corners 302.

Referring also to FIG. 4, an E-brick 300 is configured to fit within an electrically insulating brick 400 ("I-brick"). I-brick 400 may have a hollow internal region 402, in which an E-brick 300 may fit. An E-brick assembly 102 may comprise an E-brick 300 inside of an I-brick 400. Based on the E-brick design, the exterior shape of the I-brick and the shape of the hollow internal region 402 may have differing shapes. Other bricks may also comprise an E-brick inside of an I-brick. The hollow 402 may extend through the height of the I-brick 400 so that the E-brick 300 may conductively connect with the E-bricks above and below.

Figure 11:
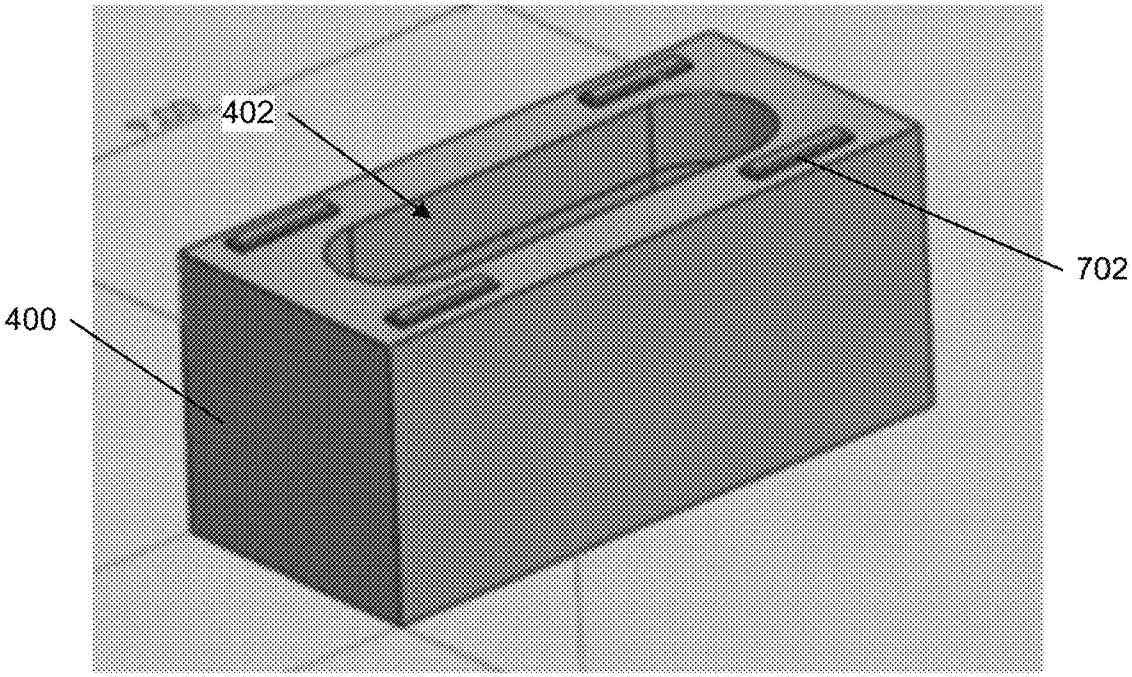
FIG. 11 shows another embodiment of an I-Brick, which is single length and single width, including tongues.

Some I-brick embodiments may comprise multiple hollows, such as a double-length I-brick with two collinear hollows, each capable of housing an E-brick. The relative sizes of the E-brick 300 and I-brick 400 may be such that there are several millimeters of clearance between the exterior sides of the E-brick and the interior sides of the I-brick hollow. For example, there may be 1, 2, 5, 7, or 10 mm of clearance. The clearance allows thermal expansion to occur at different rates between the E-brick 300 and I-brick 400, due to material and temperature differences, and reduces friction damage between the E-brick 300 and I-brick 400. The rounded corners 302 also help reduce friction force. Other bricks may have a hollow similar to hollow 402. I-bricks may comprise pin holes 404, in which pins or rods may be placed in order to align stacks of bricks. I-bricks 400 may be made in different shapes, both of the external sides and the internal hollow 402. Another example of an I-Brick is depicted in FIG. 11 to include a plurality of tongues to interlock with grooves on the bottom surface of another I-Brick.

Figure 5:
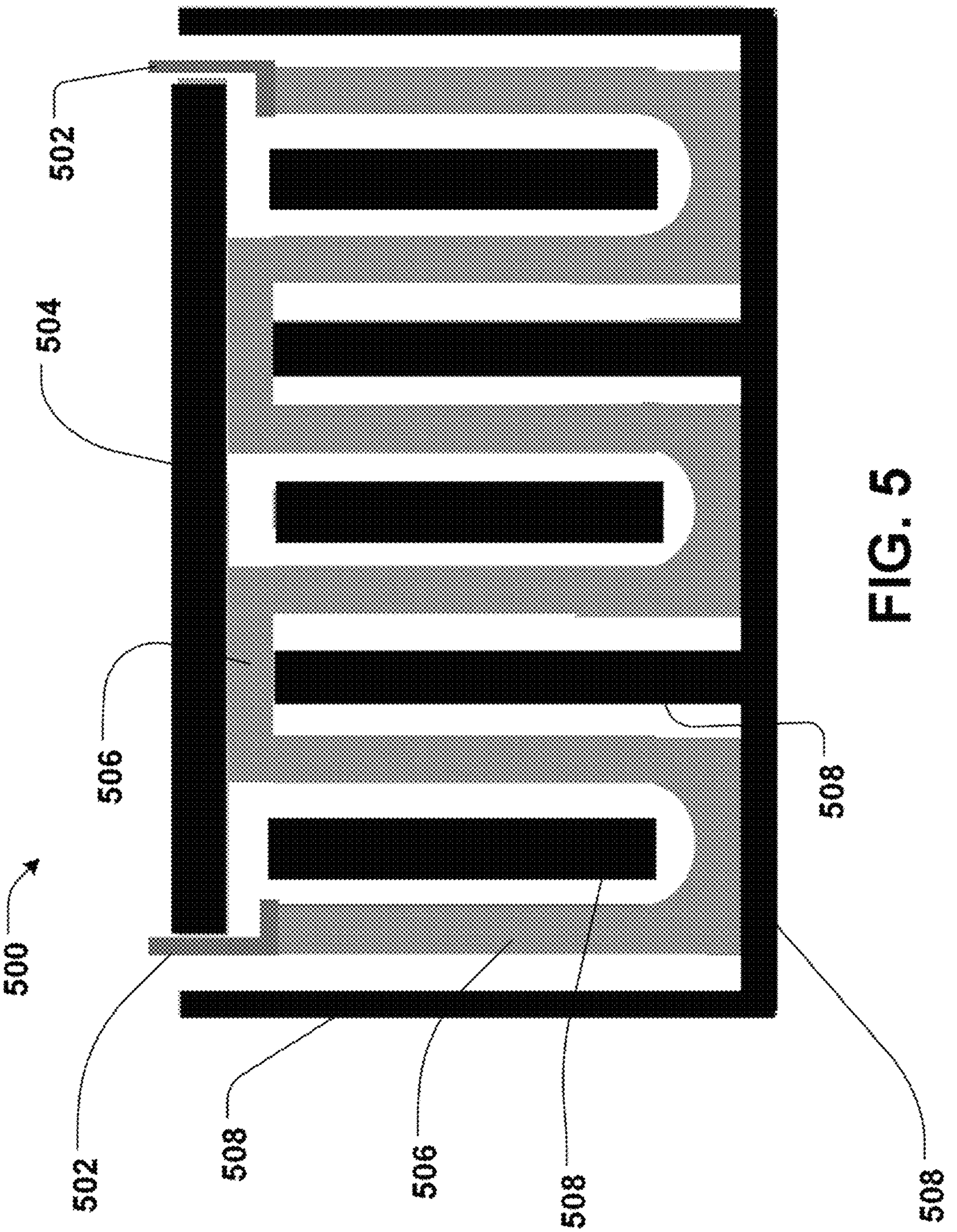
FIG. 5 provides a cross-sectional view of an exemplary E-TESS system according to an aspect of this disclosure depicting a circuit of electrically conductive brick connected to input and output electrodes.

FIG. 5 shows a cross-sectional view of an embodiment of an electrically conductive brickwork module 500 (or E-TESS) according to the present disclosure. In this embodiment, electrodes 502, which are electrically connected by means of an external current source (not shown) pass through an insulating cover 504 into the electrically conductive brickwork module 500, thereby making contact with a serpentine circuit of E-bricks 506 (adjacent columns physically and electrically connected by interconnecting E-Bricks), which are resistively heated as current passes through them from the electrodes 502. The E-bricks 506 transfer heat to the thermal I-bricks 508, thereby providing an efficient thermal energy storage mechanism.

Figure 6:
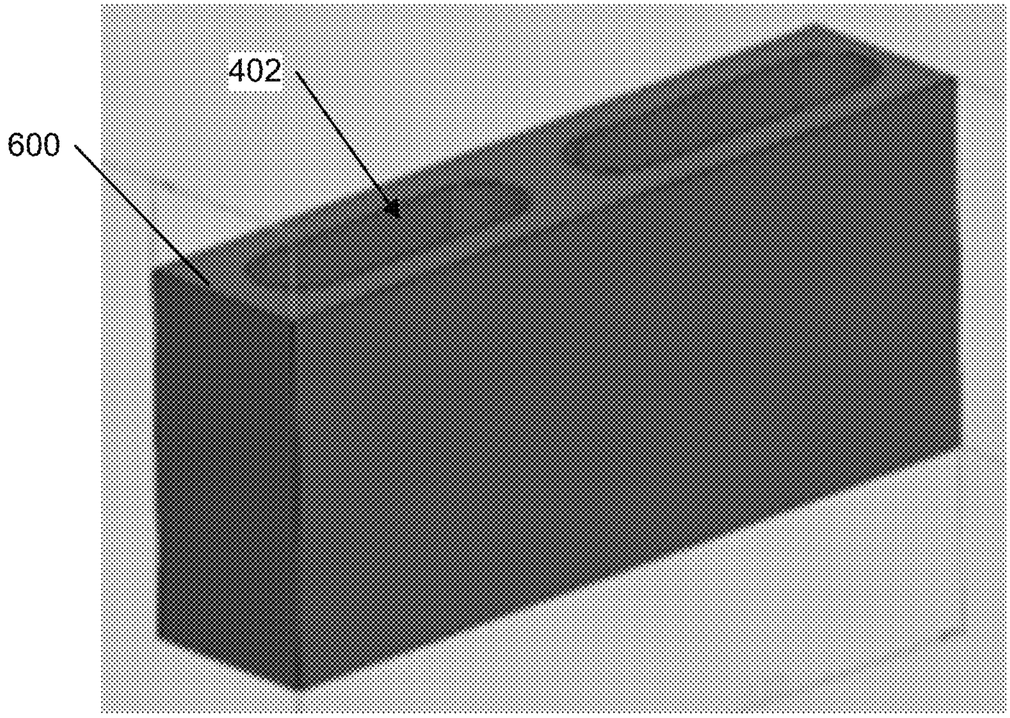
FIG. 6 shows a perspective view of an embodiment of a double wide I-Brick according to this disclosure.

FIG. 6 shows another embodiment of an I-Brick, a double-length I-Brick 600. The double-length I-Brick 600 may be the same height as I-Brick 400 but approximately twice as long, and may comprise two hollows 402, each configured to contain an E-Brick. A double-length I-Brick 600 may comprise more or fewer than two hollows 402, depending on the size and shape of the E-Brick(s). The hollows 402 may typically be collinear with each other. Double-length I-Bricks 600 may be arranged in an E-TESS in, for example, a stretcher bond, to improve structural stability of the E-TESS. In general, bricks within an E-TESS module 100 may be arranged in any bond.

FIG. 7 shows another embodiment of an I-Brick, a double-length thin brick 700. A double-length thin brick 700 is similar to a thin brick 204, but is approximately twice as long and may comprise two hollows 402 (or may have more or fewer than two hollows), each configured to, at least partially, contain an E-Brick. The hollows 402 may typically be collinear with each other. Double-length thin bricks 700 may be used in conjunction with double-wide bricks 202 such that the height of the double-wide brick 202 and double-length thin brick 700 stack is equal to the height of an E-brick assembly 102. Double-length thin bricks 700 may also be used in place of a double-wide brick 202 to maintain even levels of bricks in situations where a double-wide brick 202 is not desirable in at least one column, e.g., due to its obstructing effect on airflow, but is desirable in another column of that level.

FIG. 8 shows an embodiment of a thin brick 204, which has a flat and smooth top surface, and a hollow 402. As a note, a thin brick 204 is a type of I-Brick.

FIG. 9 shows another embodiment of a thin I-Brick 204, having a hollow 402. In this embodiment, the thin brick 204 comprises one or more tongues 902 (which could also be studs, tabs, etc.) on the top surface, configured to fit into a groove 904 (not visible from this angle) on the bottom surface of a brick, in order to secure alignment of the stacked bricks and present horizontal slipping of stacked bricks. This is akin to the function of LEGO bricks.

Figure 10:
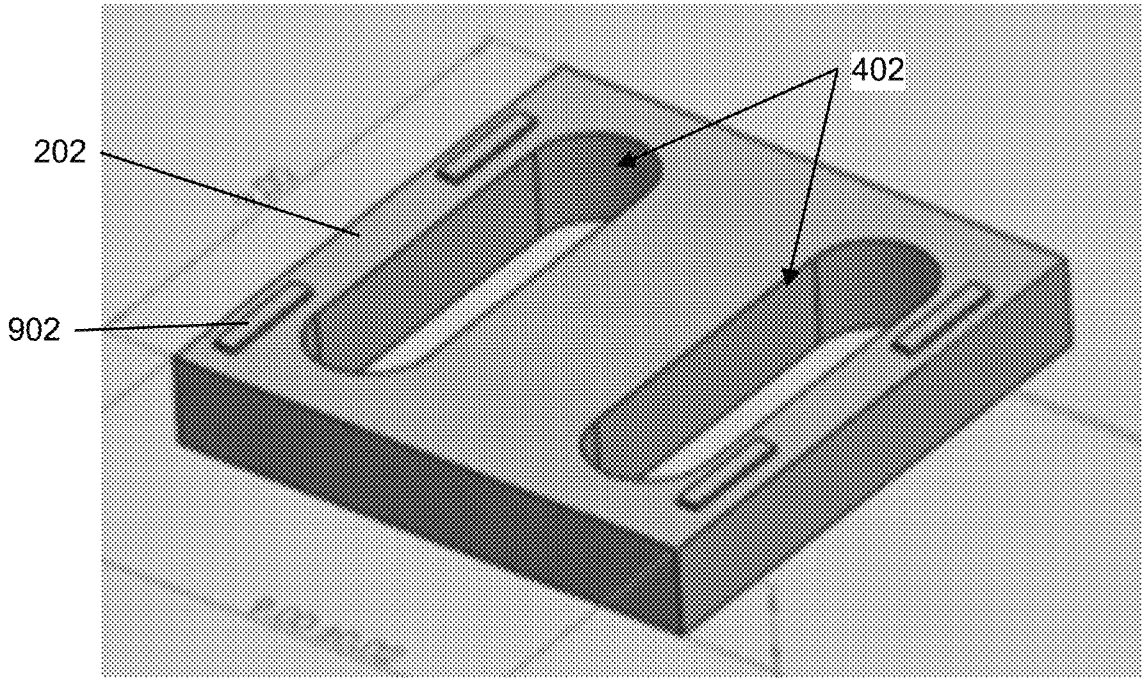
FIG. 10 shows another embodiment of a double-wide I-Brick comprising one multiple tongues for interlocking.

FIG. 10 shows an embodiment of a double-wide I-Brick 202, which contains two or more hollows 402. In this embodiment, the double-wide brick 202 comprises a plurality of tongues 902 to interlock with grooves (not shown) on the bottom of another I-Brick mated thereto. A double-wide brick 202 is also a type of I-Brick.

FIG. 11 shows another embodiment of an I-Brick 400, which is single length and single width. This embodiment of an I-Brick 400 has tongues 902.

Figure 12:
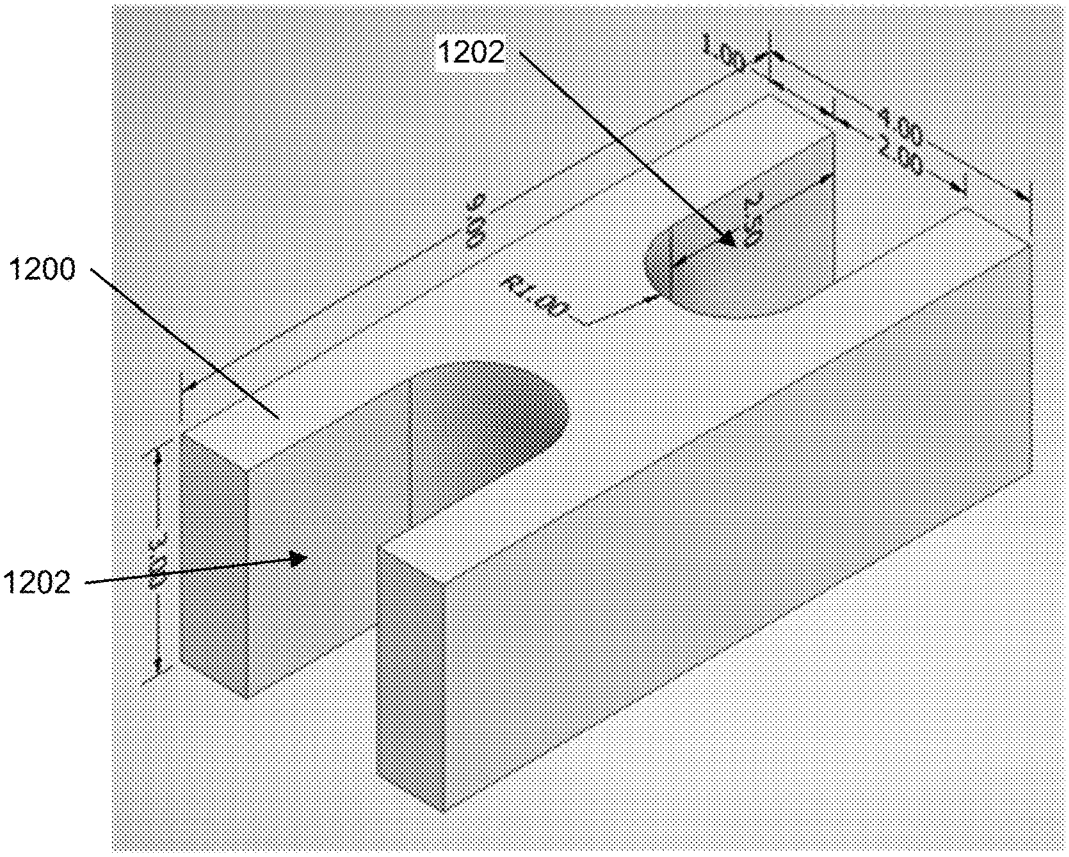
FIG. 12 shows another embodiment of an offset hollow I-Brick.

FIG. 12 shows an embodiment of an offset hollow I-Brick 1200. Embodiments of an E-TESS module 100 may, for example, use offset hollow I-Bricks 1200 instead of, or in addition to, I-Bricks 400. Offset hollow I-Brick 1200 functions similarly to an I-Brick 400, but instead of having an enclosed hollow 402, it has multiple open hollows 1202. When an offset hollow I-Brick 1200 is lined up horizontally to another offset hollow I-Brick 1200, the adjacent open hollows 1202 essentially form a closed hollow, within which an E-Brick may be contained. Other bricks, like those previously shown and described, may have alternative embodiments with open hollows akin to offset hollow I-Brick 1200.

Figure 13A:
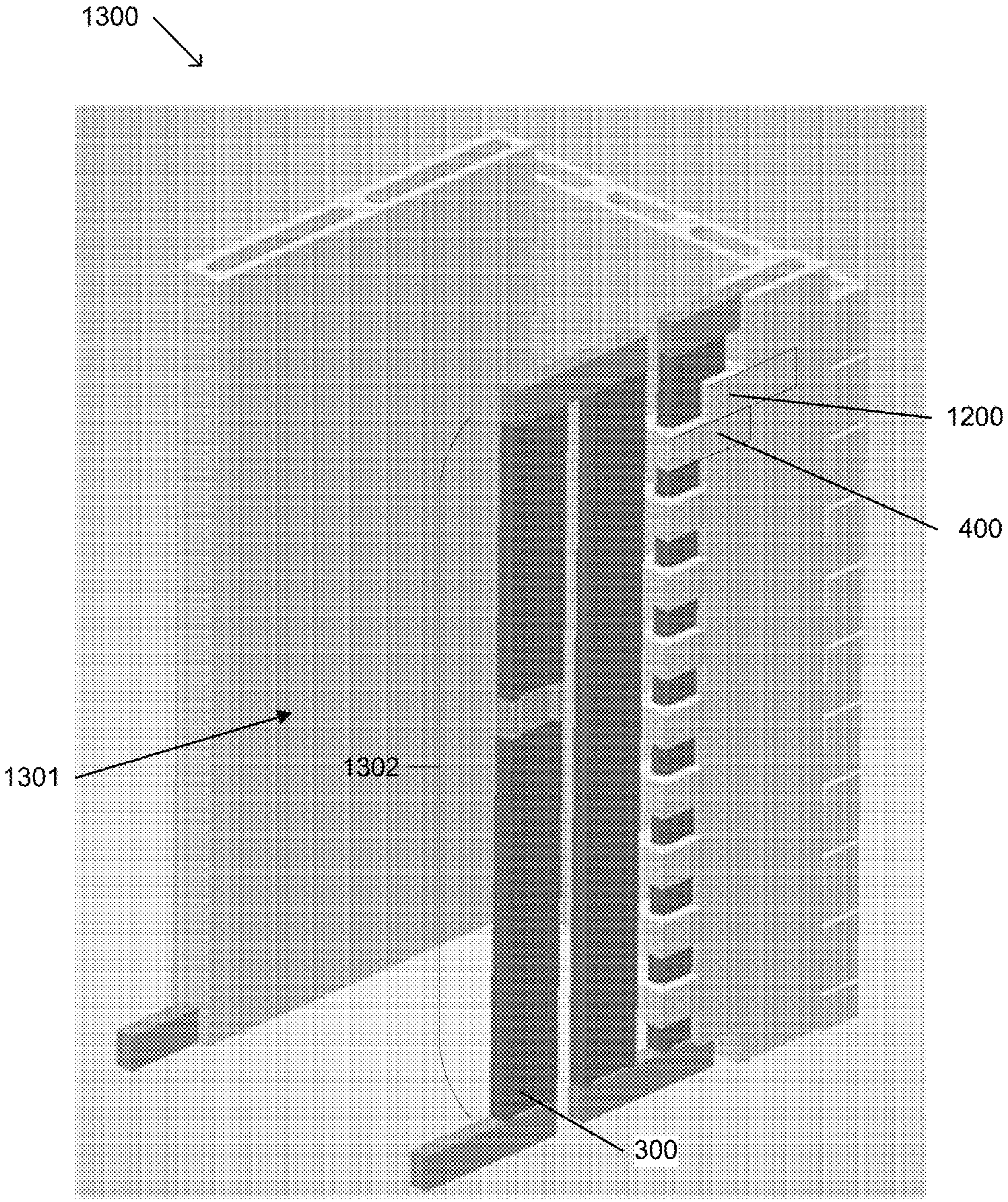
FIG. 13A shows a perspective view of partial E-TESS module according to another aspect of this disclosure.

FIG. 13A shows a partial view of another embodiment of an E-TESS module 1300, which may be an example of a part of an E-TESS module 100. E-TESS module 1300 comprises E-Brick columns 1302, which may, for example, be composed of a single E-Brick, or a stack of E-Bricks 300. E-Brick columns 1302 are physically and electrically connected by interconnecting E-Bricks at the tops and bottoms of the columns. To electrically insulate the E-Brick columns 1302, there may be offset hollow I-Bricks 1200, one of which has been partially outlined to show the extent of the side profile, as well as I-Bricks 400, one of which has also been partially outlined to show the extent of the side profile. Other bricks, not limited to the examples shown and described herein may be used to complete the E-Brick circuit(s) and I-Brick insulation, and provide structural integrity to the E-TESS 1300.

As seen in FIG. 13A, E-TESS module 1300 includes a main internal region 1301, which may be used to heat materials placed therein (not shown), e.g. metals or other solid materials, that are placed in the center of the chamber, or they may be moved through it. E-TESS 1300 is only partially depicted, i.e. it would more typically have walls surrounding the main internal region 1301 and it may be configured with an input and output through which material may be passed on conveyer system (like a walking beam furnace) to heat the material. Or, it may be configured like a chamber with a door to allow material to be placed inside in a stationary manner and removed after heating.

Figure 13B:
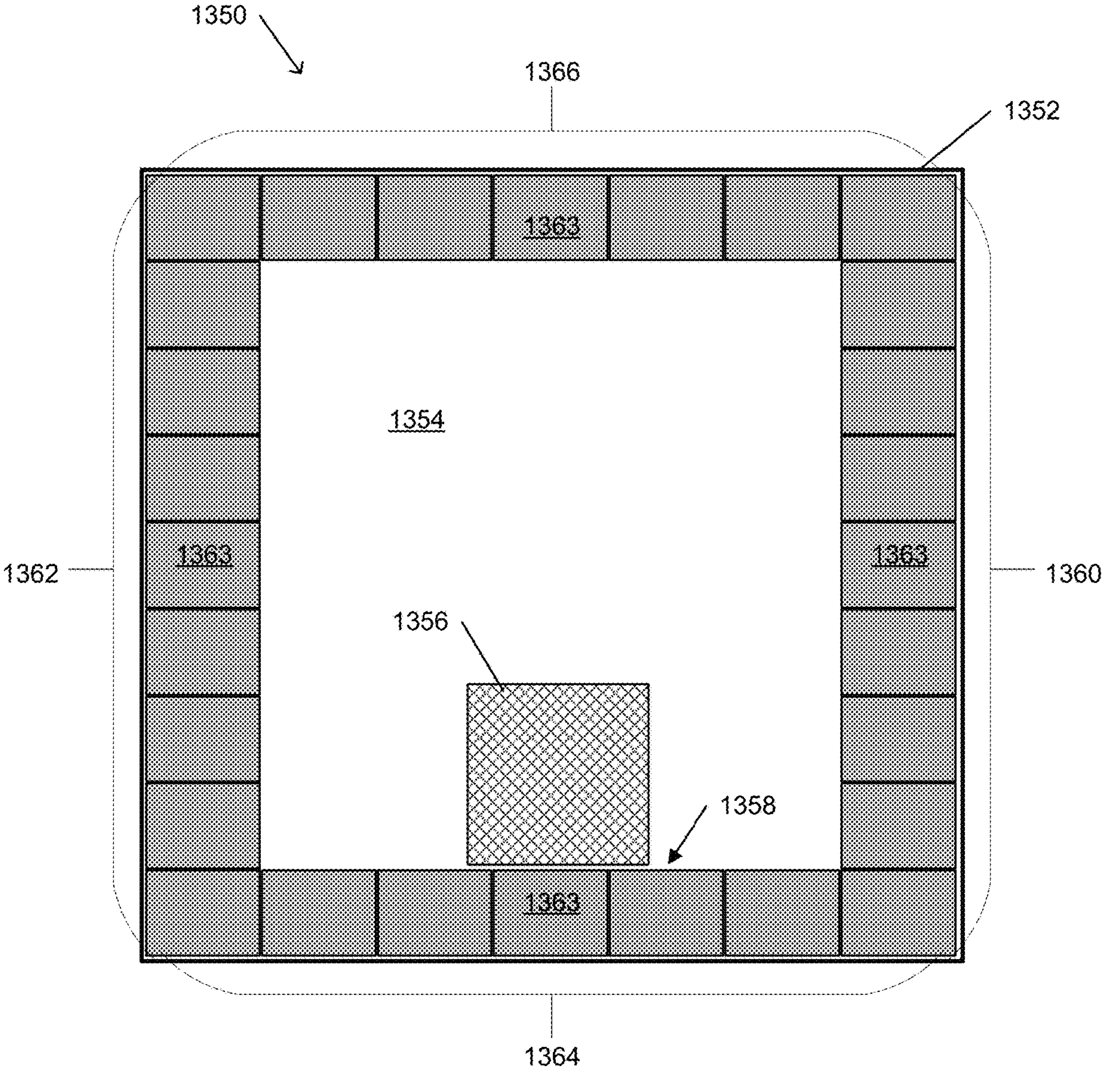
FIG. 13B shows a cross-sectional view of an E-TESS module used for heating a material according to another aspect of this disclosure.

In another embodiment, shown in cross section in FIG. 13B, there is a furnace 1350 which may include an enclosure 1352 made of a metal or brick material having an internal region 1354 within which may be placed a solid material 1356 to be heated. The solid material may be placed on a surface 1358, which may be the floor of the furnace 1350. There may be an E-Brick structure within the internal region of the enclosure 1352 to provide heating. The E-Brick structure may include one or more walls lined with E-Brick assemblies such walls 1360 and/or 1362 of the enclosure 1352 The walls may be lined with E-Brick assemblies 1363 (including an E-Brick within an interior region of an I-Brick), as described above with regard to FIGS. 3 and 4 or below with regard to FIGS. 14-31. The E-Brick structure may also include floor 1364 and/or ceiling 1366 which may be lined with the same or similar E-Brick assemblies 1363. Each part of the E-Brick structure, i.e. the E-Bricks of a single wall or the floor or ceiling may be electrically interconnected and electrically connected to an electrical source to provide a plurality of separate electrical circuits through which current may flow resulting in heating of furnace 1350. Alternatively, each part of the E-Brick structure (each wall, the floor, and ceiling) may be electrically interconnected together forming a single larger circuit for electric current to flow resulting in heating of the furnace 1350.

It should be noted that furnace 1350 could be constructed in various ways, including providing only a single wall structure, which may or may not be included within an enclosure 1352. In other words, it may be as simple as providing a stand-alone E-Brick wall placed on a surface and locating a material to be heated proximate to the wall. Or, it could be more complex, like furnace 1350, and include E-Brick assemblies on each of the four interior walls and on the floor and ceiling. It may even be configured with an input and output through which material may be passed on conveyer system (like a walking beam furnace) to heat the material.

Referring back to FIG. 3, the dog bone shape of this embodiment of the E-Brick 300 may help reduce the risk of thermal runaway during heating cycles. As described in U.S. application Ser. No. 17/462,244 (the contents of which are incorporated by reference), thermal runaway occurs in chromia bricks by way of short circuit failure, and that an electrical flow path is therefore best to be kept narrow and long, hence the contiguous serpentine circuits in an E-TESS module 100. Radiative heat transfer pathways lateral to the electrically conductive flow path can dramatically improve resilience against thermal runaway compared to exclusively conductive heat transfer pathways.

In general, an E-Brick design that is resilient against thermal runaway maintains radiative pathways no matter how it shifts within its I-Brick containment, and minimizes the solid material path length that heat must conduct through before "seeing" open radiative pathways to colder parts of the E-Brick. Note that the radiative pathways can include the walls of the I-Brick, where radiation from the hot portion of the E-Brick may travel to a colder portion by shallowly heating the surface of the hollow 402, which in turn radiates it to the cold portion of the E-Brick.

The "dog bone+hollow" E-Brick assembly 102 is a geometry that successfully satisfies problems of friction and disparate heating between the E-Brick and the I-Brick while simultaneously building in this radiative view factor for effective heat transfer. FIGS. 14 through 23 show various embodiments of E-Bricks disposed within I-Bricks, each of various shape with view factors that allow effective radiative heat transfer that prevents thermal runaway in the desired operating regime. It should be noted that the E-brick assemblies made from the various embodiments of E-Bricks disposed within I-Bricks may be assembled in into E-TESS modules comparable to E-TESS module 100 and flow channels or paths like 208 in FIG. 2 may be formed between adjacent columns of I-Bricks.

Figure 14:
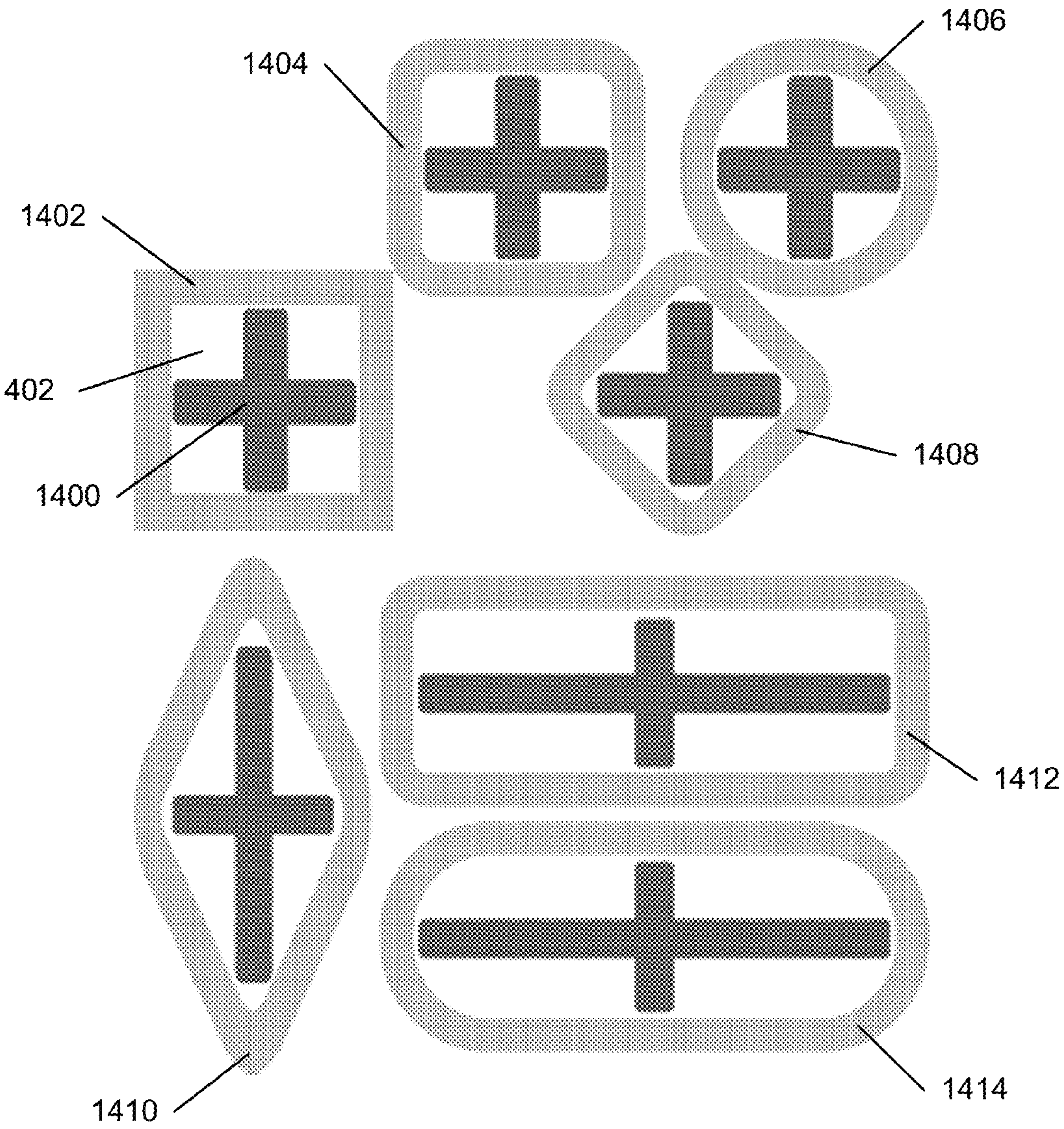
FIG. 14 shows several embodiments of cruciform (or "plus-shaped") E-Bricks according to an aspect of this disclosure.

FIG. 14 shows several embodiments of cruciform (or "plus-shaped") E-Bricks 1400 within different shapes and sizes of I-Bricks. The several shapes of I-Bricks shown include: a square 1402; a rounded square 1404, a circle 1406, a rhombus 1408, an elongated rhombus 1410, a rectangle 1412, and a flat-sided oval 1414. Each of the I-Bricks 1402-1414 have a hollow 402, within which the cruciform E-Brick 1400 is disposed. The cruciform designs shown here are alternative designs that also ensure radiative view factors between large portions of the E-Brick regardless of how it shifts in a square, circular, rectangular, oval, or rhombus-like I-Brick.

Figure 15:
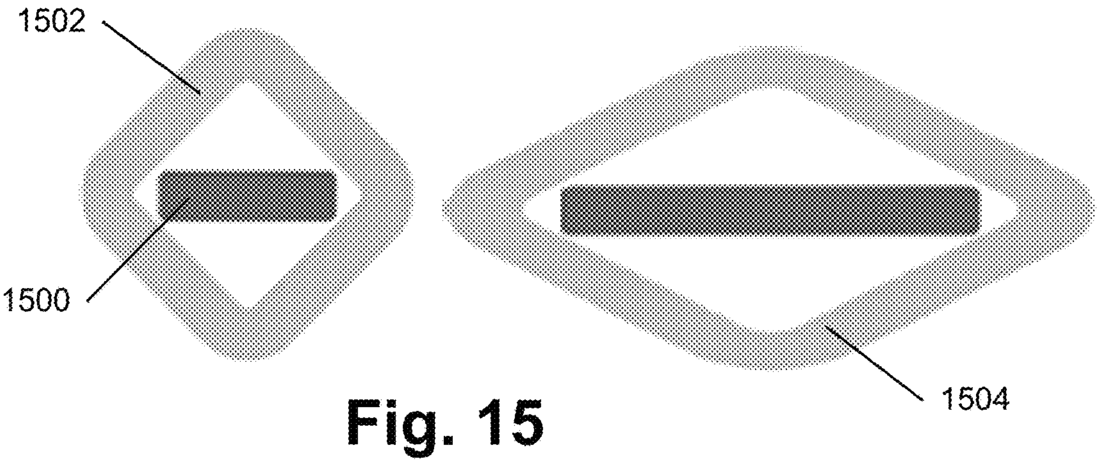
FIG. 15 shows several embodiments of a straight bar E-Brick within a rhombus I-Brick.

FIG. 15 shows several embodiments of a straight bar E-Brick 1500 within a rhombus I-Brick 1502. In these embodiments, the interior corners of the rhombus I-Brick 1502 constrain lateral and rotational movement of the straight bar E-Brick 1500, while maintaining radiative pathways along the I-Brick walls. It may also have the advantage of having a simpler to manufacture E-Brick.

Figure 16:
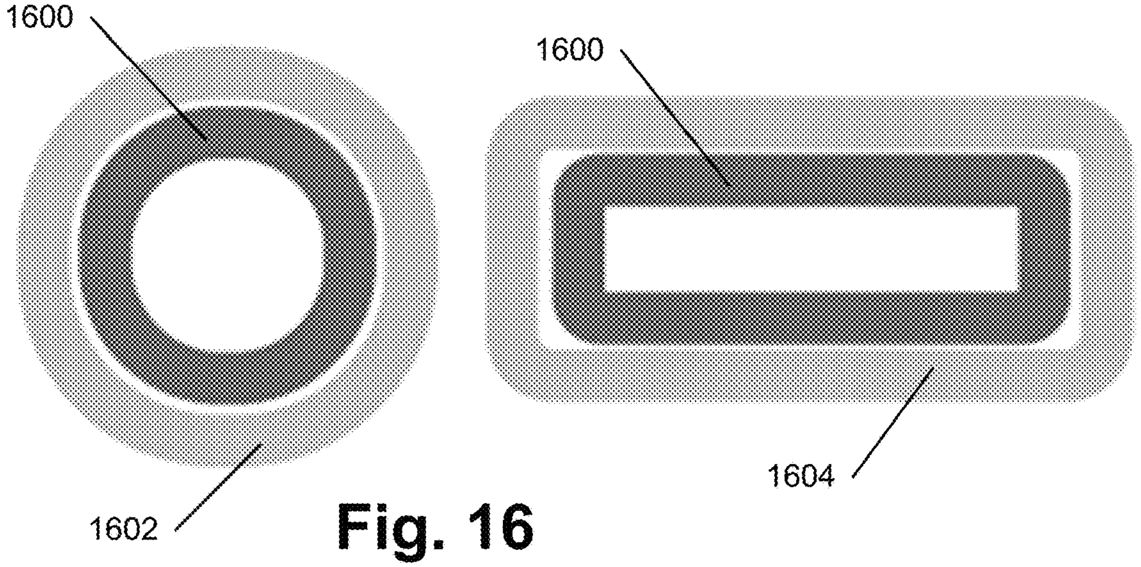
FIG. 16 shows several embodiments of hollow E-Bricks within different shaped I-Bricks.

FIG. 16 shows several embodiments of hollow E-Bricks 1600, within different shaped I-Bricks, including a circular I-Brick 1602 and a rectangular I-Brick 1604. The hollow E-Bricks 1600 have the benefit of simple internal radiative pathways.

Figure 17:
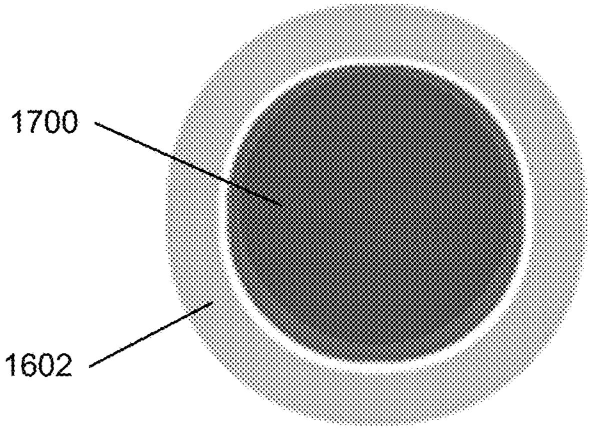
FIG. 17 shows an embodiment of a solid cylindrical E-Brick within a hollow core region of circular I-Brick.

FIG. 17 shows an embodiment of a solid cylindrical E-Brick 1700, within a hollow core region of circular I-Brick 1602.

Figure 18:
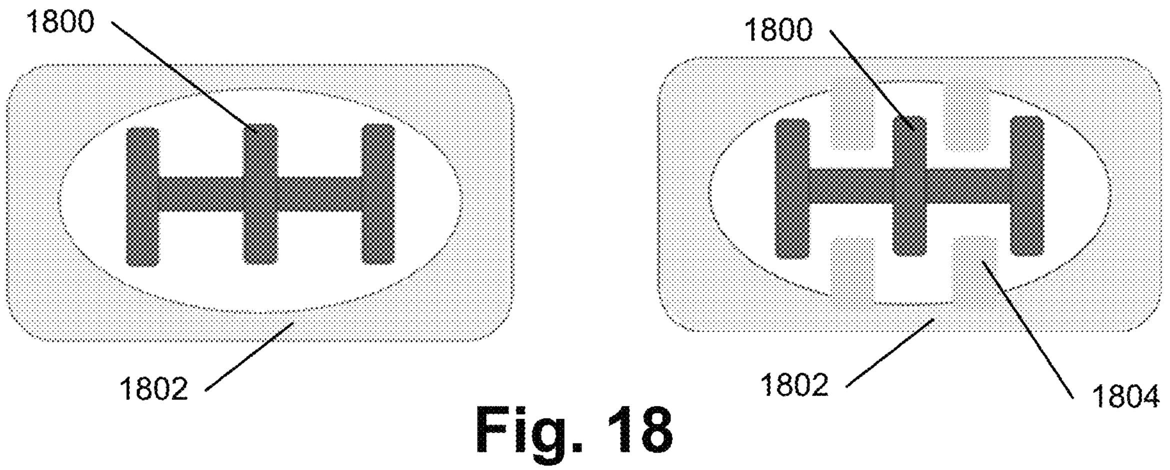
FIG. 18 shows top down views of two embodiments of an E-Brick assembly comprising a double-H shaped E-Brick.

FIG. 18 shows several embodiments of an E-Brick assembly comprising a double-H shaped E-Brick 1800 within an I-Brick 1802. In one embodiment, the I-Brick 1802 has a rectangular exterior and an oval interior. In another embodiment, the I-Brick 1802 has "teeth" 1804 protruding into the gaps of the double-H E-Brick 1800. Other shapes of I-Bricks are also possible with the double-H shaped E-Brick 1800, and other shapes of E-Bricks will be apparent to those skilled in the art, including triple-H, quadruple-H, etc. A more general way to describe the above E-Brick Shapes is to say that they include two or more intersecting electrically conductive brick sections and wherein the two or more intersecting electrically conductive brick sections each have a rectangular cross sectional shape.

Figure 19:
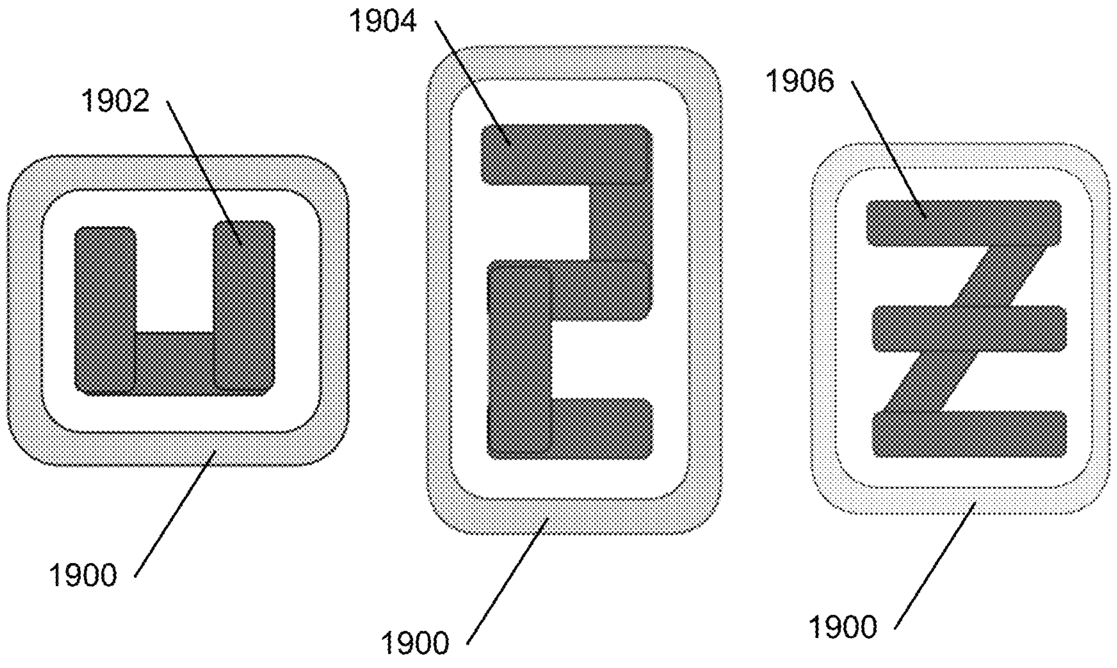
FIG. 19 shows top down views of several additional E-Brick shapes, according to this disclosure.

FIG. 19 shows additional embodiments of E-Brick shapes, including a U-shaped E-Brick 1902, a 2-Shaped E-Brick 1904, and a crossed Z-shaped E-brick 1906. I-Bricks 1900 containing these E-Bricks may or may not have teeth or protrusions 1804.

Figure 20:
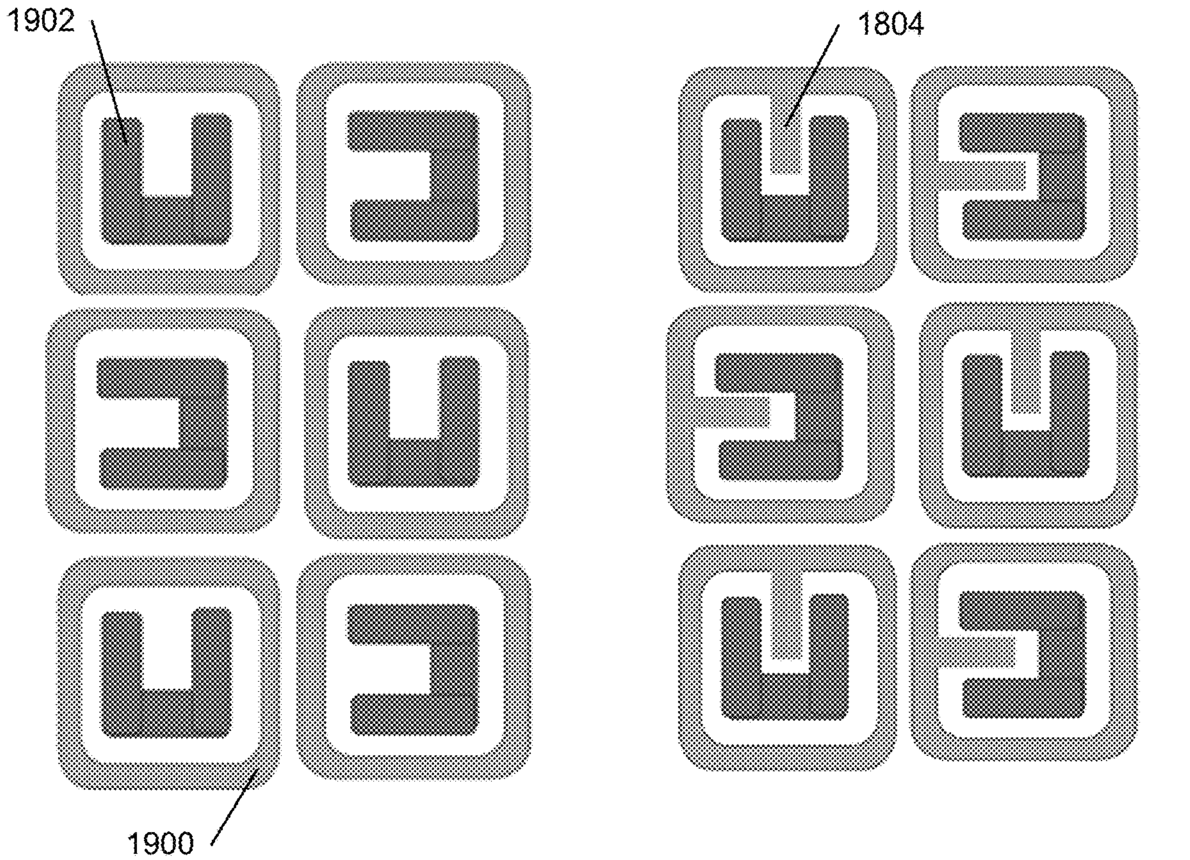
FIG. 20 shows top-down views of two embodiments of possible brickwork module structures with U-shaped E-Bricks.

FIG. 20 shows top-down views of several embodiments of a possible brickwork module structures for brickwork module or E-TESS having U-shaped E-Bricks 1902 including gaps formed there between which may define flow paths to heat a flowing gas. In an embodiment, the surrounding I-Bricks 1900 each have a tooth 1804 within the gap created by the "U" shape. The brick structure may have alternating orientations of E-Bricks 1902. As a note, the relative sizes of the E-Brick 1902 and I-Brick 1900, including the clearance between them, may not be to scale. This applies to all diagrammatic figures in this application.

Figure 21:
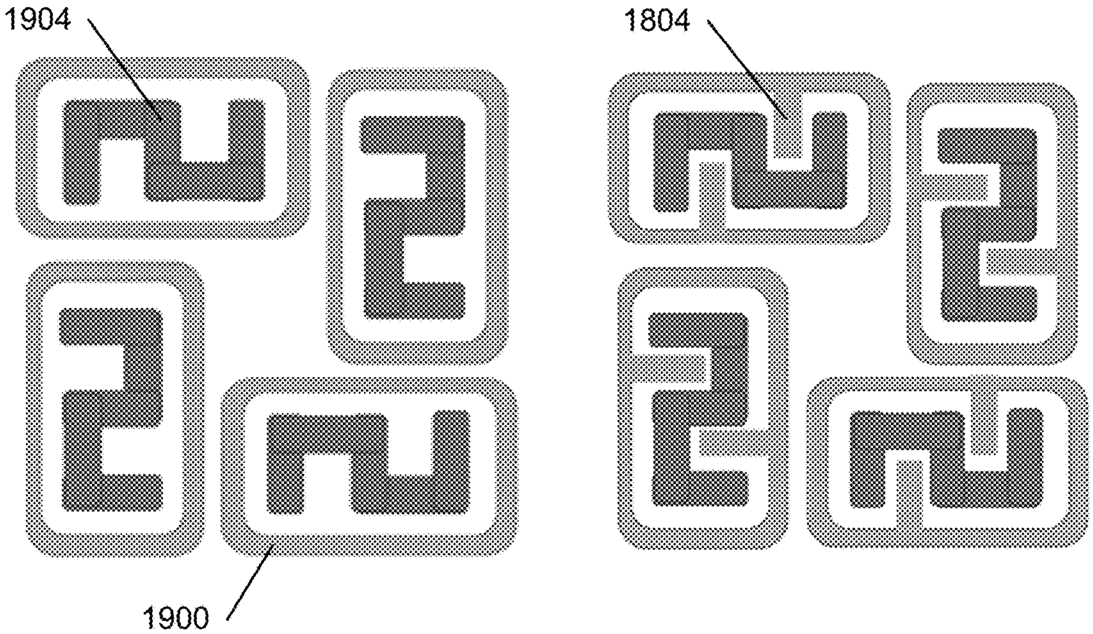
FIG. 21 shows top-down views of two additional embodiments of possible brickwork module structures with 2-shaped E-Bricks.

FIG. 21 shows top-down views of several embodiments of a possible brickwork module structures for a brickwork module or E-TESS having 2-shaped E-Bricks 1904 including gaps formed there between which may define flow paths to heat a flowing gas. In an embodiment the surrounding I-Bricks 1900 each have protrusions or teeth 1804 within the gaps created by the "2" shape. The brick structure may have alternating orientations of E-Bricks 1904.

Figure 23:
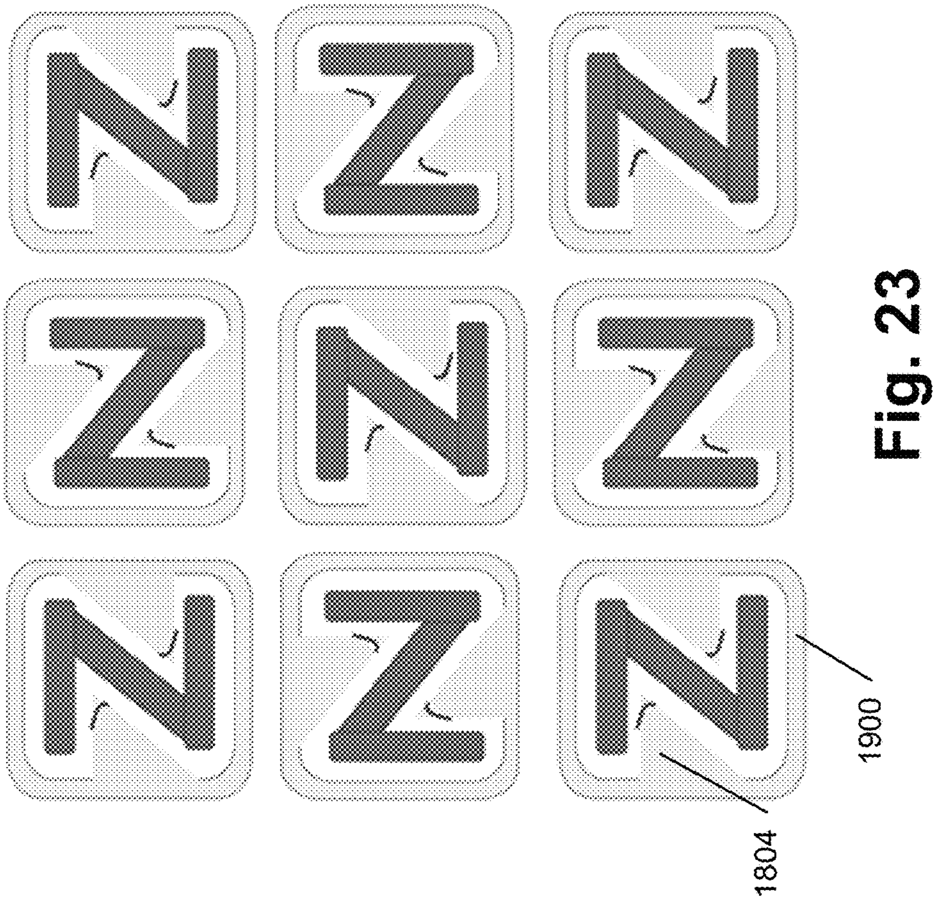
FIG. 23 shows a top-down view of another embodiment embodiments of a possible brickwork structure for a brickwork module having N-shaped or Z-shaped E-Bricks.
Figure 22:
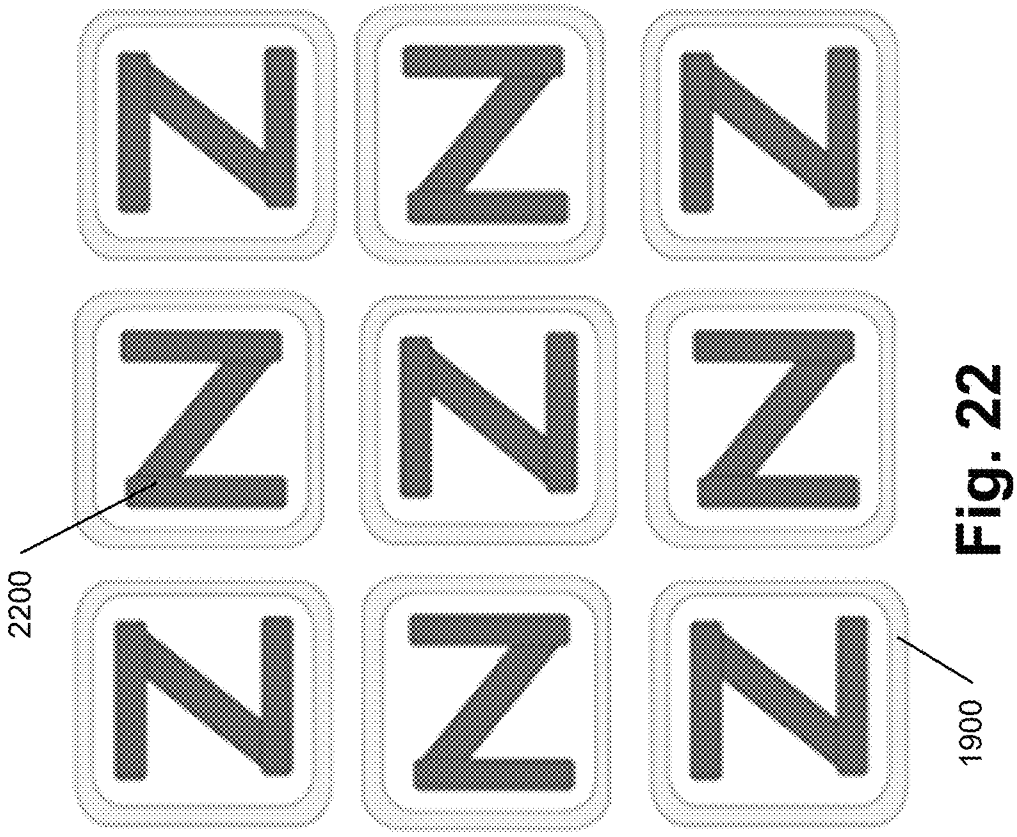
FIG. 22 shows a top-down view an embodiment embodiments of a possible brickwork structure for a brickwork module having N-shaped or Z-shaped E-Bricks.

FIGS. 22 and 23 show top-down views of several embodiments of a possible brickwork structures for a brickwork module or E-TESS having N-shaped E-Bricks 2200, which could also be crossed Z-shaped E-Bricks 1906. There are gaps formed between the brickwork structures which may define flow paths to heat a flowing gas. In an embodiment, the surrounding I-Bricks 1900 have teeth 1804 within the gaps created by the "N" shape (or crossed Z-shape). The teeth 1804 may be, for example, triangular in cross-section. The brick structure may have alternating orientations of E-Bricks 2200 (or 1906).

Figure 24:
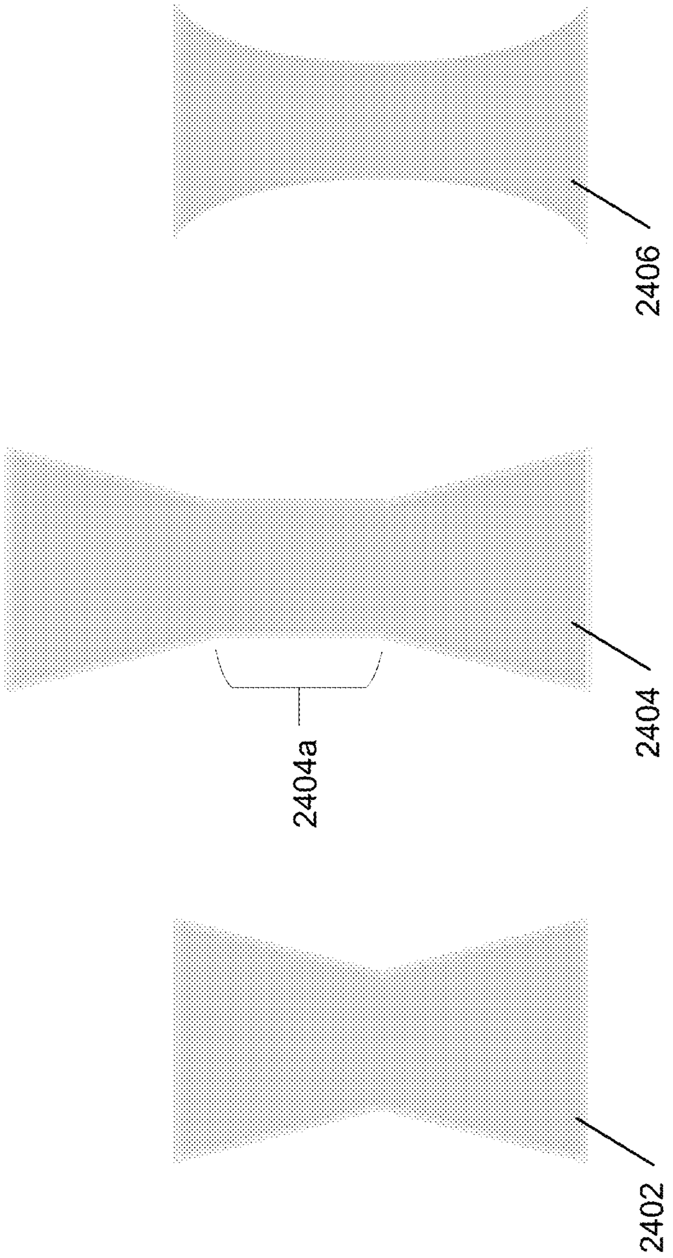
FIG. 24 shows several embodiments of bowtie-shaped E-Bricks.

FIG. 24 shows several embodiments of bowtie-shaped E-Bricks, including a simple bowtie 2402, an extended bowtie 2404, which has a flat middle section 2404*a*, and a curved bowtie 2406. Bowtie E-Bricks widen toward the top and bottom edges (from this perspective) and their thickness is minimum in the middle. The widening brings more heat to the far-to-reach corners of the I-Brick and the thin middle section keeps the core temperatures manageable. The bowtie E-Bricks shown may not be to scale and although not shown, the edges may be filleted or chamfered.

Figure 25:
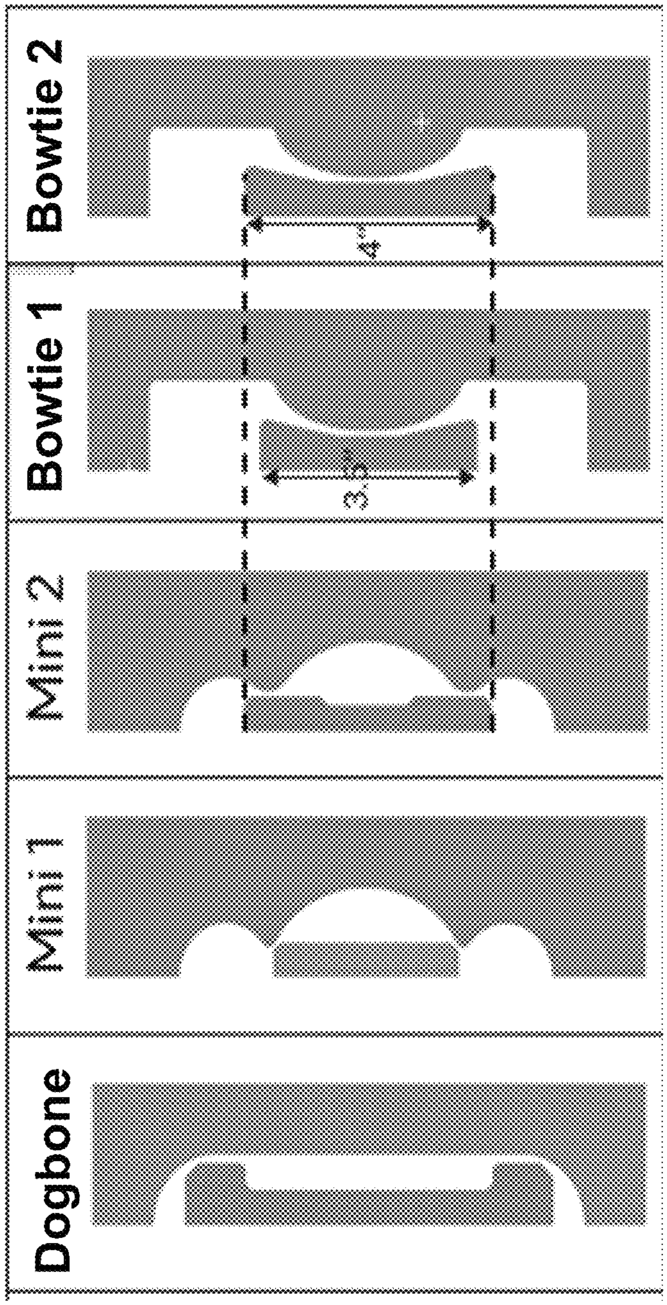
FIG. 25 shows several additional embodiments of E-Bricks and corresponding I-Bricks, according to aspects of this disclosure.

FIG. 25 shows several embodiments of E-Bricks and corresponding I-Bricks. The volumes and volume ratios of each are shown in the table below.

| | Dogbone | Mini 1 | Mini 2 | Bowtie 1 | Bowtie 2 |
|---|---|---|---|---|---|
| E-Brick volume($cm^3$) | 24 | 9.6 | 11.7 | 13.2 | 14.8 |
| I-Brick volume($cm^3$) | 73.4 | 99.4 | 98.8 | 84.9 | 84.9 |
| $\frac{I - \text{brick } vol}{E - \text{brick } vol}$ | 3.07 | 10.35 | 8.44 | 6.43 | 5.74 |

In FIG. 25, wherein the hollow interior region of the electrically insulating bricks may include a first convex section and a second convex section opposite the first convex section. The electrically insulating bricks may include a first plurality of concave sections and a second plurality of concave sections opposite the first plurality of concave sections.

Figure 26:
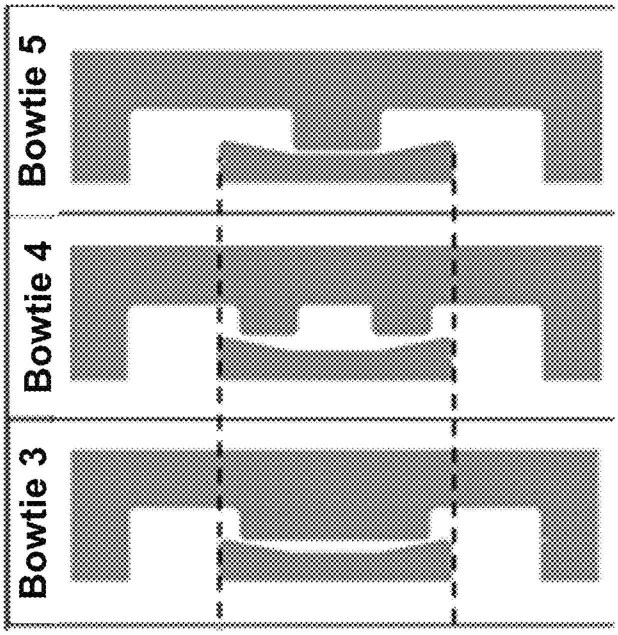
FIG. 26 shows several additional embodiments of E-Bricks and corresponding I-Bricks, according to aspects of this disclosure.

FIG. 26 shows several additional embodiments of E-Bricks and corresponding I-Bricks. It should be noted that only half E-Brick and I-Brick assemblies are shown for ease of viewing. Each would include a symmetrical second half. The volumes and volume ratios are each shown below in the table.

| | Bowtie 3 | Bowtie 4 | Bowtie 5 |
|---|---|---|---|
| E-Brick volume ($cm^3$) | 14.8 | 14.8 | 14.8 |
| I-Brick volume ($cm^3$) | 85.8 | 80.7 | 81.0 |
| $\frac{I - \text{Brick } vol}{E - \text{Brick } vol}$ | 5.79 | 5.45 | 5.47 |

Figure 27:
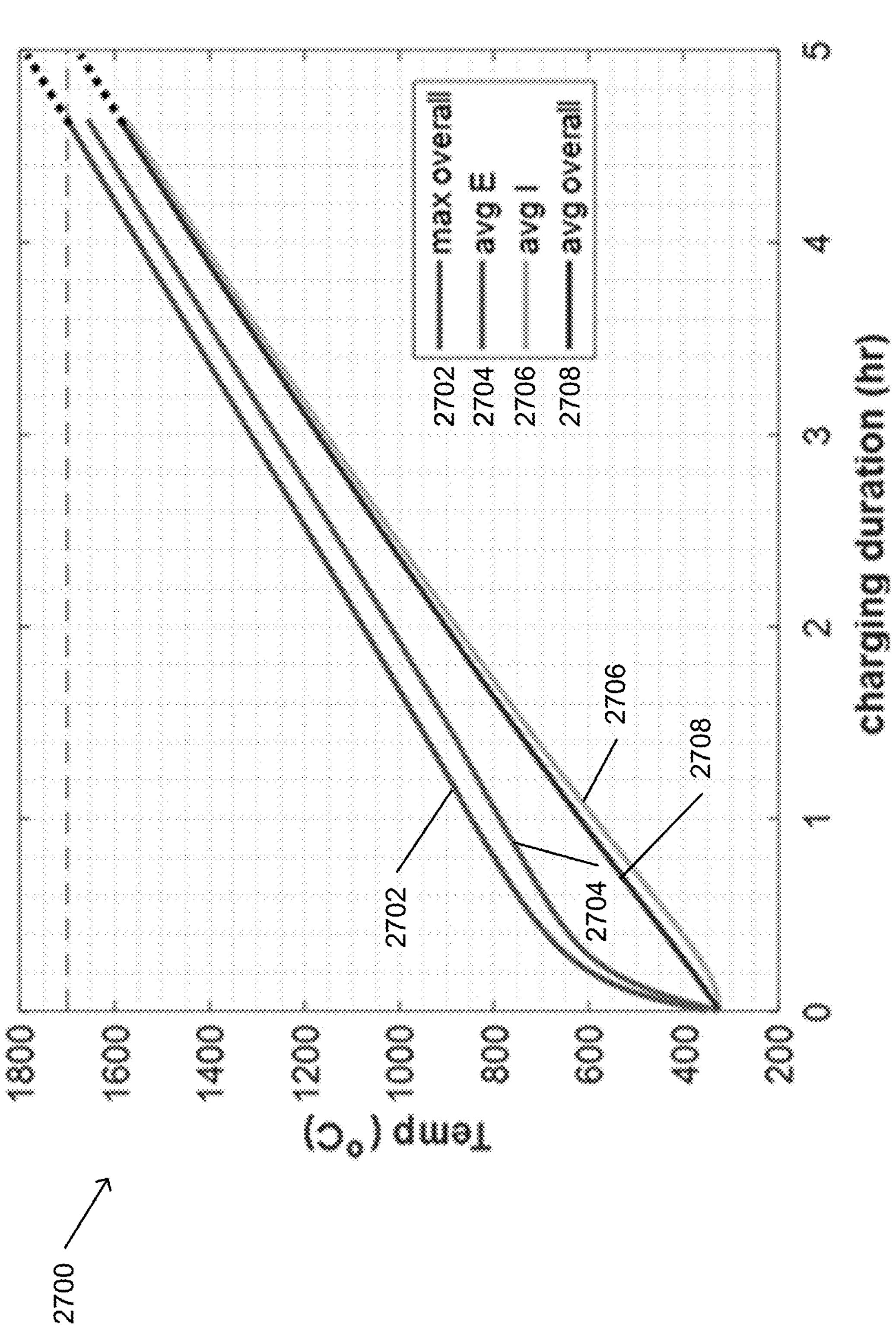
FIG. 27 shows a graph of thermal charging rates of an embodiment of an E-TESS module according to an aspect of this disclosure.

FIG. 27 shows a graph 2700 of thermal charging rates of an embodiment of an E-TESS module 100. The graph 2700 contains data for the maximum charging rate of an E-TESS module 100 overall 2702, the average charging rate of the E-Bricks 2704, the average charging rate of the I-Bricks 2706, and the average charging rate of the E-TESS module 100 overall 2708. As shown in graph 2700, E-Bricks thermally charge faster than I-Bricks initially, though their charging rates approach parallel over time. Additionally, in this embodiment, the E-TESS module 100 reaches the target temperature of 1700° C. after about 5 hours of charging.

Figure 29:
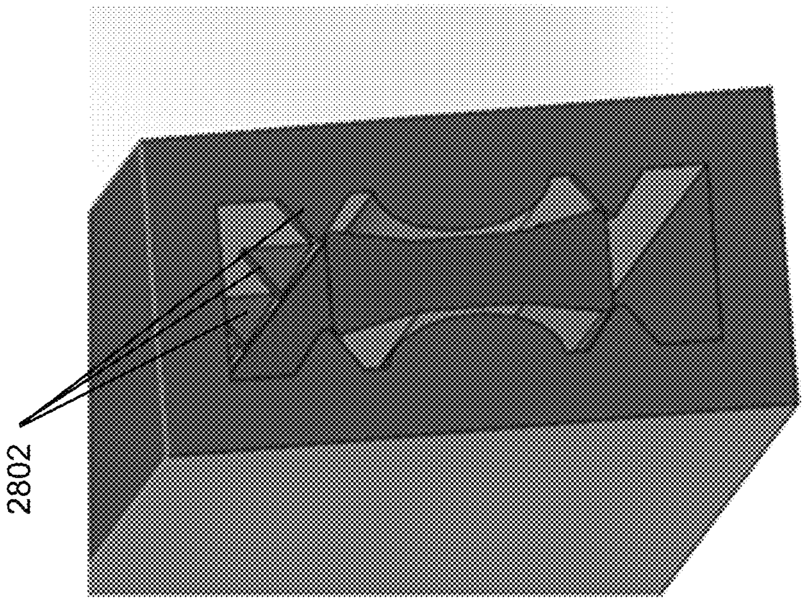
FIG. 29 shows a perspective view of the E-Brick/I-Brick embodiment of FIG. 28.
Figure 28:
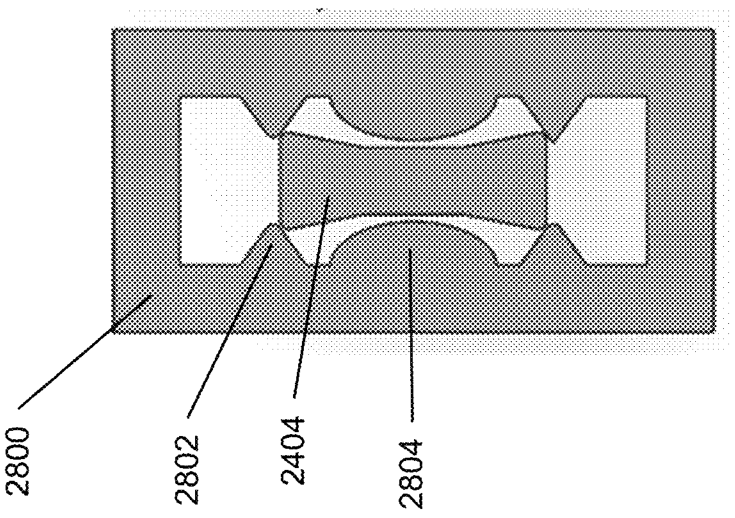
FIG. 28 shows a top down view of an extended bowtie E-Brick within a "razor blade" I-Brick.

FIGS. 28 and 29 show an embodiment of an extended bowtie E-Brick 2404 within a "razor blade" I-Brick 2800. The razor blade I-Brick 2800 functions similarly in its restraint of rotational and lateral motion (and has a slight cross-sectional resemblance) to a double-edged razor blade. The razor blade I-Brick 2800 comprises prongs 2802, which constrain the lateral motion of the extended bowtie E-Brick 2404, as well as convex protrusions 2804 which constrain the rotational motion of the E-Brick 2404. As can be seen in the perspective view shown in FIG. 29, the prongs 2802 may be placed periodically through the razor blade I-Brick 2800.

Describing the E-Brick 2404 and I-Brick 2800 of FIGS. 28 and 29 more generally, I-Brick 2800 may have an interior surface defined by the hollow interior region wherein a cross section of the interior surface has a generally rectangular shape. From the rectangular shape there are projecting from a first side of the interior surface first and second triangular protrusions between which projects a first convex section. Projecting from a second side opposite the first surface are third and fourth triangular protrusions between which projects a second convex protrusion. The electrically conductive brick has a bow tie cross-sectional shape is disposed between the first side of the interior surface and the second side of the interior surface.

Figure 30:
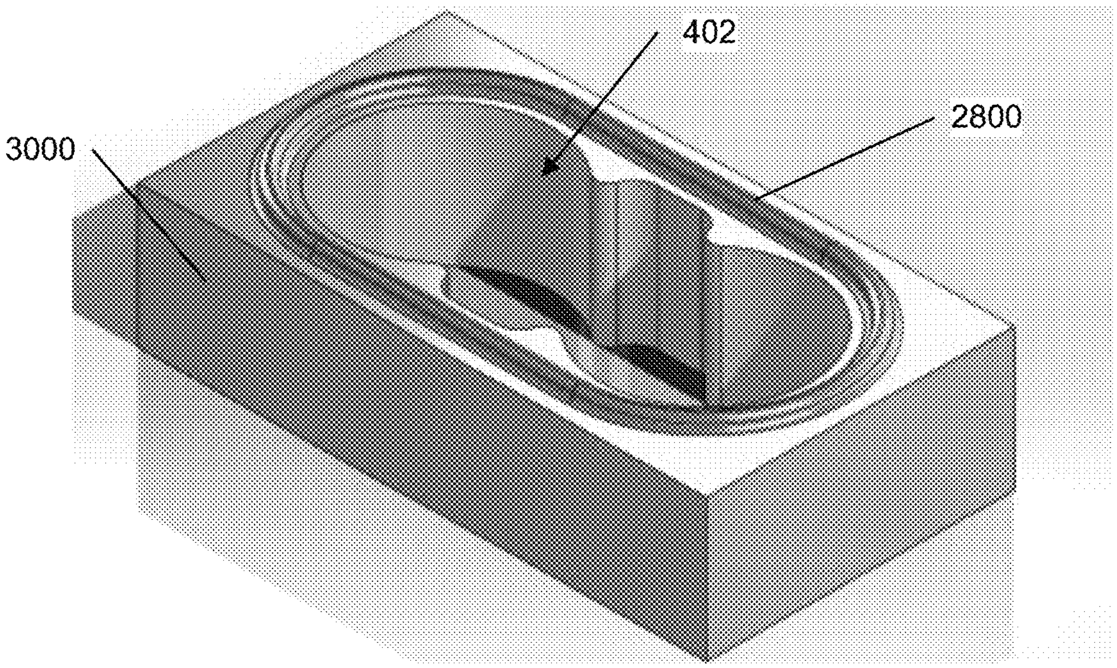
FIG. 30 shows perspective view of an embodiment of a double-cylinder I-Brick according to an aspect of this disclosure.

FIG. 30 shows an embodiment of a double-cylinder I-Brick 3000, which has a hollow 402 configured to fit two solid cylindrical E-Bricks 1700 (or hollow circular E-Bricks 1600, or other E-Bricks with a cylindrical profile). The double-cylinder I-Brick 3000 may also have a protruding ring around the hollow 402, which may act similarly to tongues 902.

The hollow interior region of the Double-cylinder I-Brick has an interior surface defined by the hollow interior region and the interior surface includes a first semi-circular section and a second semi-circular section opposite the first semi-circular section. Each of the first semi-circular section and the second semi-circular section are configured to receive an electrically conductive brick having a circular cross-sectional shape.

Figure 31:
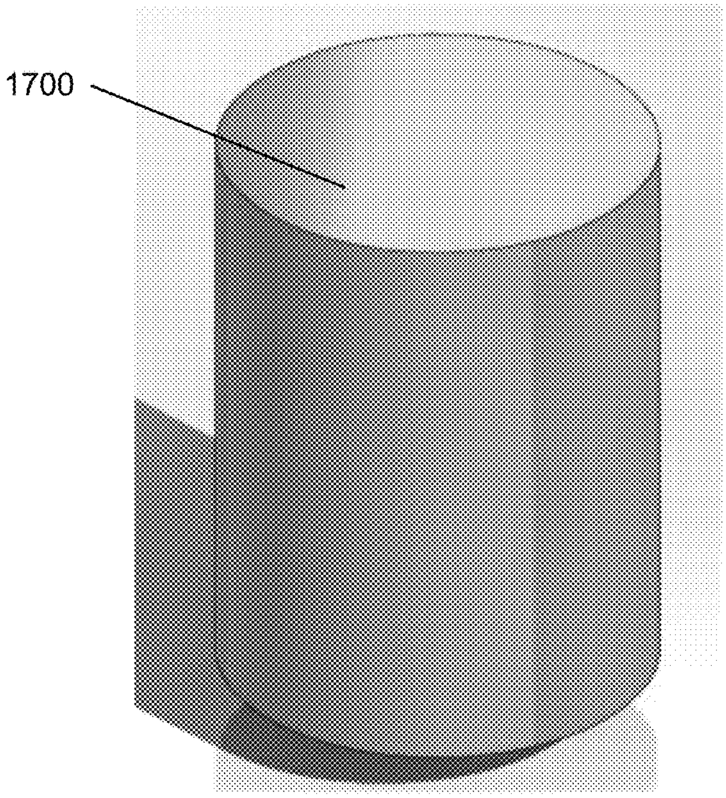
FIG. 31 shows perspective view of a cylindrical E-Brick according to an aspect of this disclosure.

FIG. 31 shows a perspective view of an embodiment of a solid cylindrical E-Brick 1700.

Figure 32:
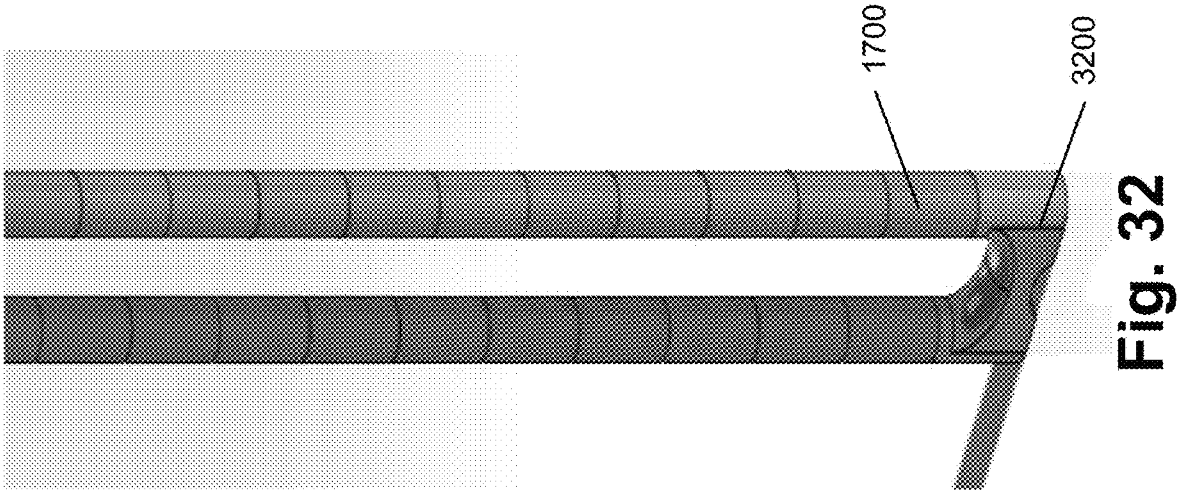
FIG. 32 shows an embodiment of two columns of cylindrical E-Bricks.

FIG. 32 shows an embodiment of two columns of cylindrical E-Bricks 1700 which may be contained in a plurality of vertically stacked I-Bricks 3000, FIG. 30. There is a double-cylinder end connector 3200, which electrically connects the two columns, and has a flat base configured for standing. The double-cylinder end connector 3200 is another example of an end connector 206.

Figure 33:
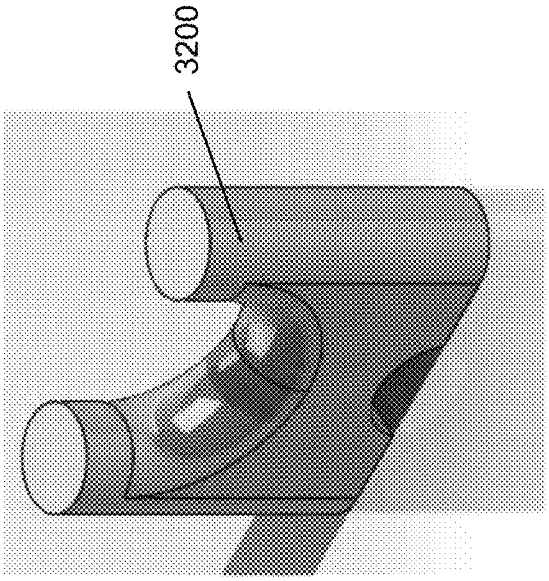
FIG. 33 shows a perspective view of a double-cylinder end connector.

FIG. 33 shows an individual view of a double-cylinder end connector 3200.

Figure 34:
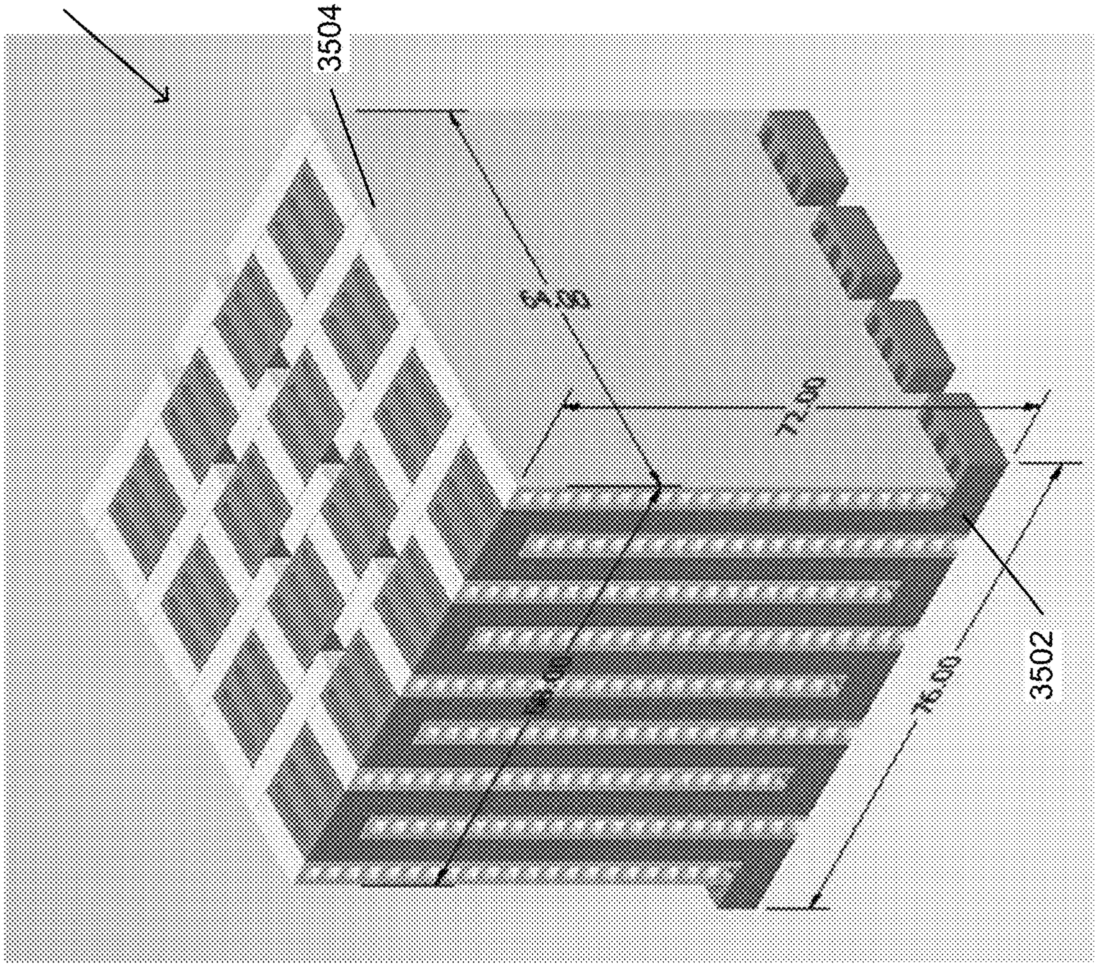
FIG. 34 shows a perspective view of an alternative embodiment of a brickwork module.

FIG. 34 shows an alternative brickwork module 3500, which may be an example of an alternative type of E-TESS module 100. Brickwork module 3500 comprises contiguous serpentine circuits of E-Bricks 3502, separated by I-Bricks 3504. Unlike previously shown embodiments, the E-Bricks 3502 are not contained within I-Bricks 3504. And, I-Bricks 3504 the gas flow paths are formed in an interior region of the I-Bricks via tunnels or channels through them, through which air may flow to harvest the stored thermal energy. In this way, the E-Bricks 3502 are not exposed to the flowing air. the plurality. The gas flow paths may have an arched shape.

Figure 35:
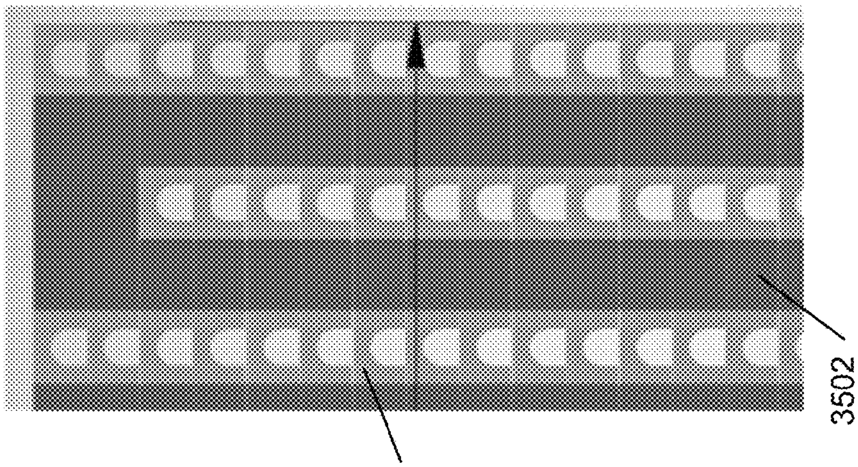
FIG. 35 shows a closer side view of the brickwork module of FIG. 34.

FIG. 35 shows a closer side view of the shipping container brickwork module 3500.

As depicted in FIGS. 34 and 35, the electrically conductive brickwork module 3500, conductive bricks are arranged in an array having a width dimension and a length dimension and the plurality of electrically insulating barriers formed of electrically insulating bricks 3504 are interconnected and form a first plurality of barrier walls running along the length dimension and across the width dimension of the array and a second plurality of barrier walls running along the width dimension and across the length dimension of the array. The barrier walls running across a width of the brickwork module intersect the barrier walls across the length of the brickwork module. The gas flow paths flow paths may be disposed in one of the first plurality of barrier walls or the second plurality of barrier walls.

The sets of electrically conductive bricks 3502 are arranged in one of a plurality of columns or a plurality of rows and each set of electrically conductive bricks is physically and electrically connected to an adjacent set of electrically conductive bricks by an interconnecting electrically conductive brick.

The embodiments of the disclosure described above are intended to be merely exemplary; numerous variations and modifications will be apparent to those skilled in the art. All such variations and modifications are intended to be within the scope of the present disclosure.

What is claimed is:

1. An electrically conductive brickwork module configured to be used in an electrically heated thermal energy storage system or a resistive heating system to heat fluid flowing across a dimension of the electrically conductive brickwork module from an input to an output, comprising:

a plurality of electrically insulating columns each formed of a plurality of electrically insulating bricks, wherein each electrically insulating brick includes a hollow central region;

a plurality of electrically interconnected conductive bricks disposed in each insulating column through the hollow central regions of the electrically insulating bricks; the plurality of electrically interconnected conductive bricks configured to be heated when electricity flows there through; and at least one flow path from the input to the output of the electrically conductive brickwork module formed by a gap between at least two of the plurality of electrically insulating columns configured to direct a fluid flowing from the input to the output without the fluid physically contacting the plurality of electrically conductive bricks.

2. The electrically conductive brickwork module of claim 1 wherein there are a plurality of flow paths from the input to the output of the electrically conductive brickwork module formed by a gap between each adjacent electrically insulating column of the plurality of electrically insulating columns.

3. The electrically conductive brickwork module of claim 2 wherein between each adjacent electrically insulating column there is included an interconnecting electrically conductive brick to electrically connect the electrically interconnected conductive bricks disposed in each of the electrically insulating columns.

4. The electrically conductive brickwork module of claim 2 wherein in a direction across the plurality of flow paths are disposed a plurality of interlocking insulating bricks at one or more height positions of the plurality of electrically insulating columns to provide structural support for the electrically conductive brickwork module.

5. The electrically conductive brickwork module of claim 4 wherein in a direction along the plurality of flow paths are disposed a plurality of interlocking insulating bricks at one or more height positions of the plurality of electrically insulating columns to provide structural support for the electrically conductive brickwork module.

6. The electrically conductive brickwork module of claim 1 wherein the electrically insulating bricks are staggered in both lengthwise and widthwise directions, such that an electrically insulating brick is laid across the joint of two or more electrically insulating bricks below it.

7. The electrically conductive brickwork module of claim 2 wherein the interlocking insulating bricks are interlocked with adjacent insulating bricks of by tongue and groove patterns on the tops and bottoms of each brick, respectively.

8. The electrically conductive brickwork module of claim 2 wherein the interlocking insulating bricks have a height less than a height of the non-interconnecting electrically insulating bricks.

9. An electrically conductive brickwork module configured to be used in an electrically heated thermal energy storage system and/or a resistive heating system to heat a fluid flowing across a dimension of the electrically conductive brickwork module from an input to an output, comprising:

a plurality of electrically interconnected sets of electrically conductive bricks configured to be heated when electricity flows there through;

a plurality of electrically insulating barriers formed of electrically insulating bricks, an electrically insulating barrier disposed between each pair of adjacent sets of electrically conductive bricks; and a plurality of flow paths physically separated from the electrically conductive bricks and configured to direct a fluid flowing from the input to the output.

10. The electrically conductive brickwork module of claim 9 wherein the plurality of flow paths are disposed in an interior region of one or more of the plurality of electrically insulating barriers.

11. The electrically conductive brickwork module of claim 10 wherein the plurality of flow paths have an arched cross-sectional shape.

12. The electrically conductive brickwork module of claim 10 wherein the plurality of electrically interconnected sets of electrically conductive bricks are arranged in an array having a width dimension and a length dimension and the plurality of electrically insulating barriers formed of electrically insulating bricks are interconnected and form a first plurality of barrier walls running along the length dimension and across the width dimension of the array and a second plurality of barrier walls running along the width dimension and across the length dimension of the array.

13. The electrically conductive brickwork module of claim 12 wherein the first plurality of barrier walls intersect with the second plurality of barrier walls.

14. The electrically conductive brickwork module of claim 12 wherein the plurality of flow paths are disposed in one of the first plurality of barrier walls or the second plurality of barrier walls.

15. The electrically conductive brickwork module of claim 9 wherein the plurality of sets of electrically conductive bricks are arranged in one of a plurality of columns or a plurality of rows and each set of electrically conductive bricks is physically and electrically connected to an adjacent set of electrically conductive bricks by an interconnecting electrically conductive brick.

16. An electrically conductive brickwork module configured to be used in an electrically heated thermal energy storage system and/or a resistive heating system to heat a fluid flowing across a dimension of the electrically conductive brickwork module from an input to an output, comprising:

a plurality of electrically interconnected sets of electrically conductive bricks configured to be heated when electricity flows there through;

a plurality of electrically insulating bricks separating each pair of adjacent sets of the plurality of electrically interconnected sets; and a plurality of flow paths defined by the plurality of electrically insulating bricks and physically separated from the electrically conductive bricks to direct the fluid flowing from the input to the output.

* * * * *